(12) United States Patent
Pereira

(10) Patent No.: US 9,414,101 B1
(45) Date of Patent: Aug. 9, 2016

(54) SYSTEM FOR PROVIDING MULTIMEDIA CONTENT VIA A CABLE TELEVISION DISTRIBUTION NETWORK IN RESPONSE TO INPUT FROM A PERSONAL COMMUNICATION DEVICE

(75) Inventor: Roy Pereira, Duluth, GA (US)

(73) Assignee: Cox Communications, Inc., Atlanta, GA (US)

( * ) Notice: Subject to any disclaimer, the term of this patent is extended or adjusted under 35 U.S.C. 154(b) by 1394 days.

(21) Appl. No.: 12/553,472

(22) Filed: Sep. 3, 2009

(51) Int. Cl.
*H04N 7/173* (2011.01)
*H04N 21/239* (2011.01)
*H04N 21/27* (2011.01)

(52) U.S. Cl.
CPC ........... *H04N 21/2393* (2013.01); *H04N 21/27* (2013.01)

(58) Field of Classification Search
CPC ............... H04N 21/21; H04N 21/2393; H04N 21/25891; H04N 21/26258; H04N 21/26606; H04N 21/27; H04N 21/437; H04N 21/47202
USPC ............... 725/87, 88, 110, 141, 153
See application file for complete search history.

(56) References Cited

U.S. PATENT DOCUMENTS

2002/0010925 A1* 1/2002 Kikinis ........................... 725/39

* cited by examiner

*Primary Examiner* — Dominic D Saltarelli
(74) *Attorney, Agent, or Firm* — Benjamin A. Balser; Next IP Law Group

(57) ABSTRACT

A system for providing multimedia content via a cable television distribution network in response to input received from a personal communication device. The system interacts with personal communication devices configured with downloaded system application computer software to receive and present information associated with multimedia content from the infrastructure via a data communication network. The system also interacts with the personal communication devices to receive data from the personal communication devices via a data communication network where the data comprises, but is not limited to, data representative of selections of multimedia content, data representative of instructions controlling the delivery and/or presentation of the multimedia content, and data identifying end user cable television network interface devices to receive the multimedia content. Additionally, the system delivers data and/or signals corresponding to the selected multimedia content to identified end user cable television network interface devices connected to the cable television distribution network.

35 Claims, 29 Drawing Sheets

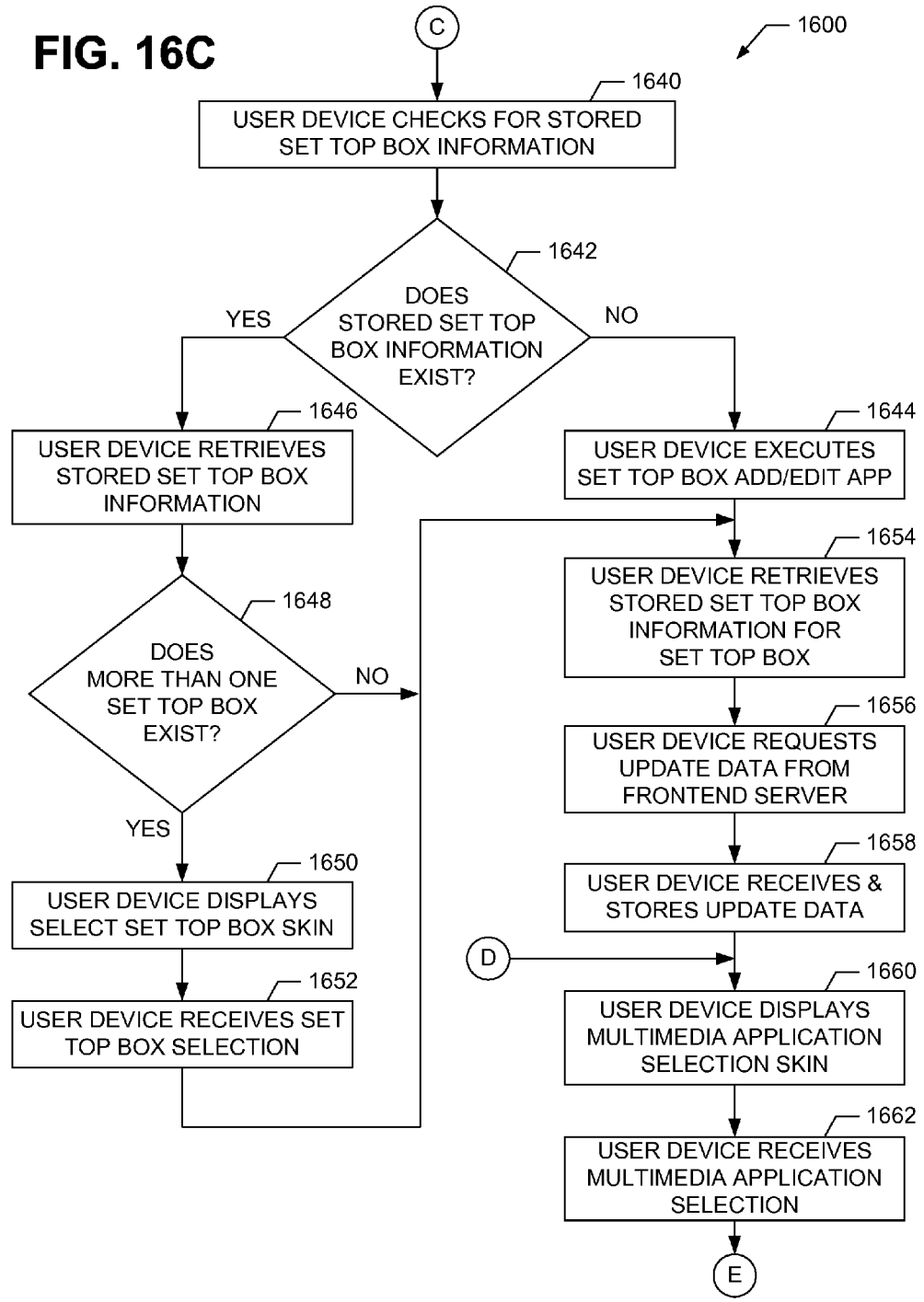

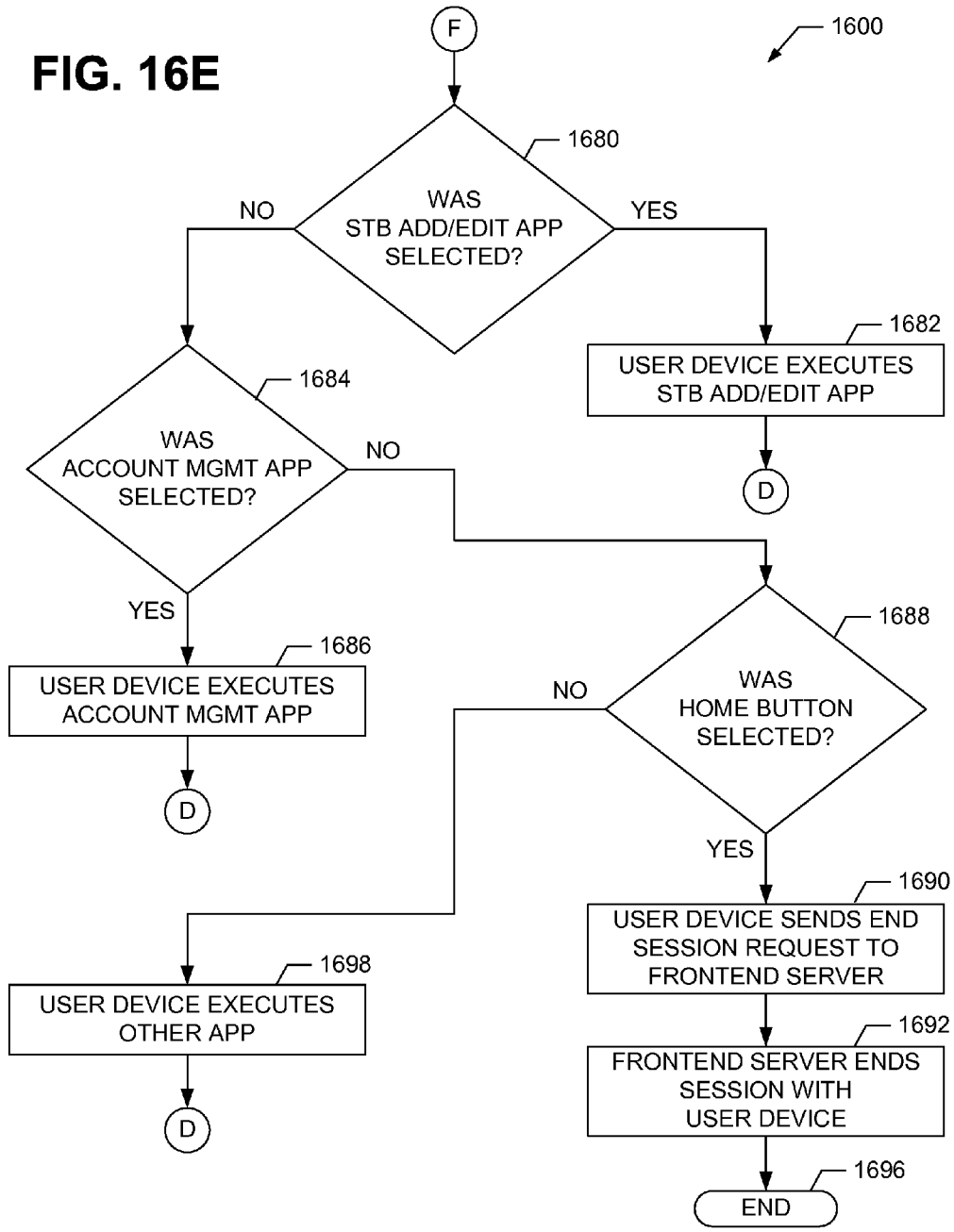

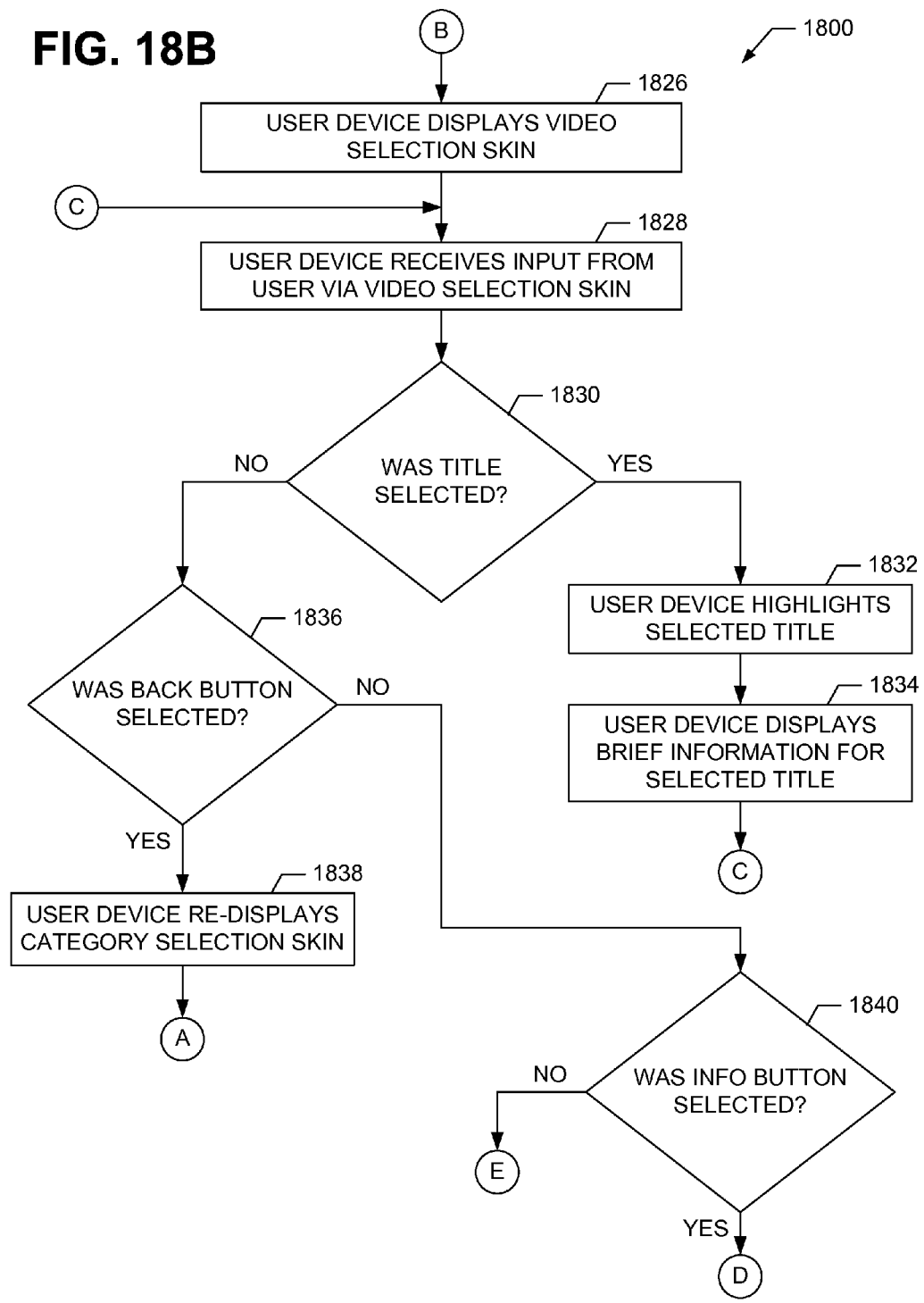

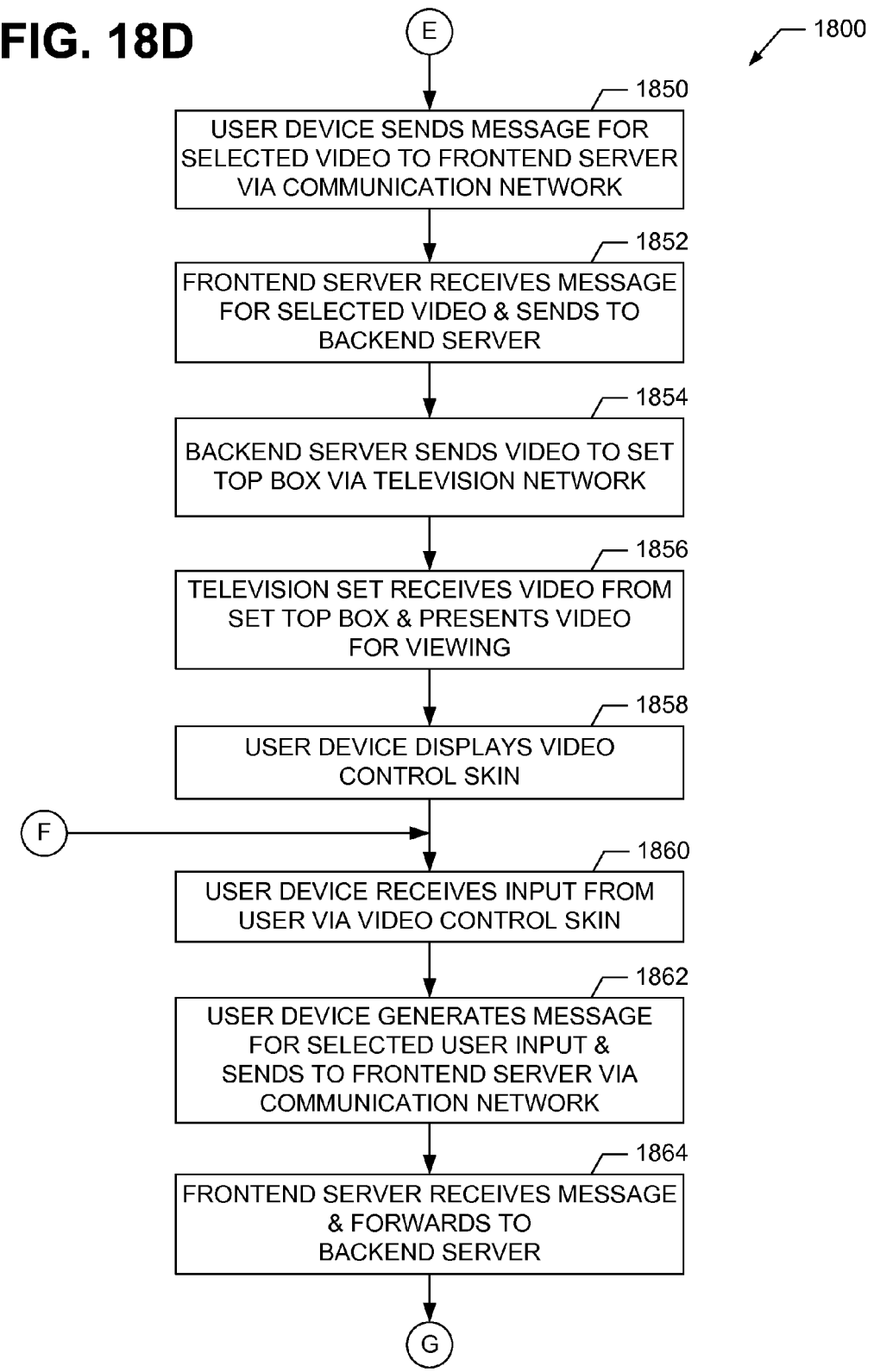

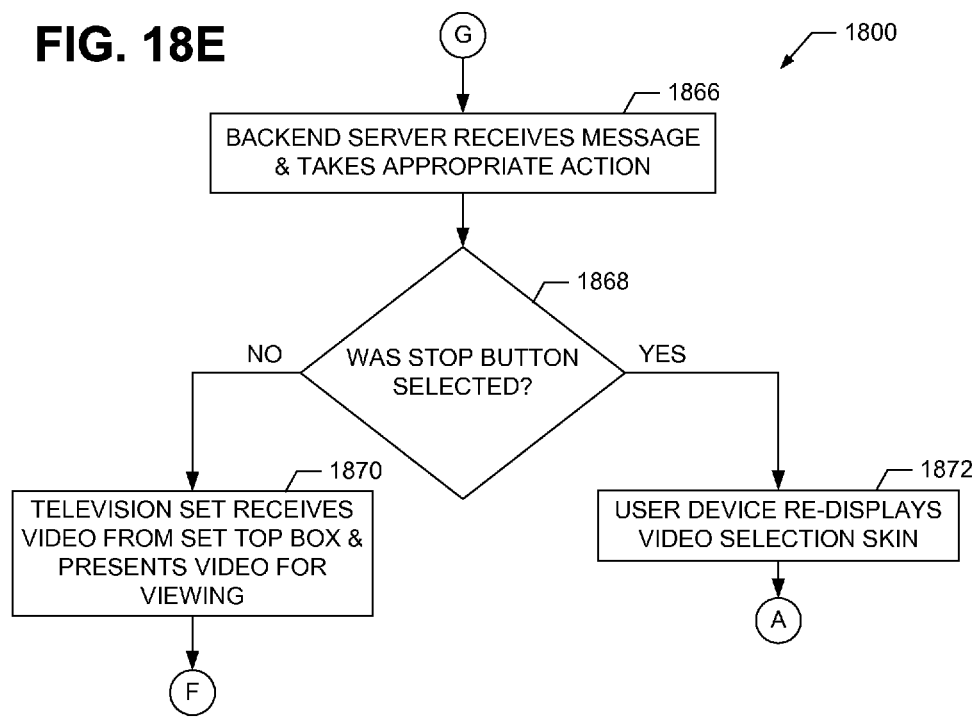

SYSTEM FOR PROVIDING MULTIMEDIA CONTENT VIA A CABLE TELEVISION DISTRIBUTION NETWORK IN RESPONSE TO INPUT FROM A PERSONAL COMMUNICATION DEVICE

FIELD OF THE INVENTION

The present invention relates, generally, to the field of systems, including apparatuses and methods, for providing multimedia content via a cable television distribution network.

BACKGROUND

Many television viewers receive cable television programming, video on demand, audio on demand and other similar programming or services via an end user cable television network interface device (commonly and sometimes referred to as a "set top box") electrically and communicatively connected to a television set. The set top box is, in turn, electrically and communicatively connected to a cable television distribution network of a cable television service provider. In operation, the set top box acts as an interface to the cable television distribution network, receiving and causing the display of program guide data listing television programs available for viewing at various times and of menus identifying video and audio available on demand, receiving inputs from a viewer, possibly encrypting the inputs for security, and communicating the inputs to the cable television distribution network. The set top box also receives signals and/or data representative of viewer selected television programs and viewer selected video and/or audio on demand, possibly decrypts the signals and/or data, and outputs the signals and/or data to a television set for presentation to a viewer.

Typically, a set top box includes a microprocessor that executes computer software programs stored in the set top box to provide viewers with the above described and other functionality. The computer software programs generally include a proprietary computer software kernel and other computer software that interacts with and uses functions provided by the kernel. The computer software is written and/or controlled by the set top box manufacturer and, therefore, may not be modified by a cable television service provider in order to substantially change the functionality and usability of the user interface provided by the set top box. Even if the computer software were not controlled by the set top box manufacturer, the computer software is often difficult to write and modify, requiring a substantial time and resource commitment by a cable television service provider to do so. Thus, as a practical matter, the functionality and the user interface that a set top box provides is relatively unchangeable once the set top box is built. As a consequence, it is difficult for a cable television service provider to deliver new features and functionality to its customers as the entertainment industry and its business models evolve and change over time.

Therefore, there is a need in the industry for apparatuses and methods that enable a cable television service provider to deliver a dynamic, often and easily changeable, interface to their services and networks and for their changing product and/or service offerings to customers.

SUMMARY

Broadly described, the present invention comprises a system, including apparatuses and methods, for providing multimedia content via a cable television distribution network in response to input received from a personal communication device. The system's apparatuses and methods interact with personal communication devices configured with downloaded system application computer software to receive and present, without limitation, information associated with television programs or other multimedia content from the infrastructure via a data communication network. The system's apparatus and methods also interact with the personal communication devices to receive data from the personal communication devices via a data communication network where the data comprises, but is not limited to, data representative of selections of television programs and/or other multimedia content, data representative of instructions controlling the delivery and/or presentation of the television programs and/or other multimedia content, and data identifying end user cable television network interface devices to receive the television programs and/or multimedia content. Additionally, the system's apparatuses and methods deliver data and/or signals corresponding to the selected television programs and/or multimedia content to identified end user cable television network interface devices connected to the cable television distribution network.

Advantageously, the system eliminates the need for complicated, proprietary computer software present in many set top boxes that is controlled by the set top box manufacturers. Because the application computer software downloaded to the personal communication devices is readily changeable, the system enables new features and capabilities to be provided, as desired, by cable television service providers. And, because the personal communication devices do not communicate with an end user cable television interface device via infrared or radio frequency technology, the system enables selection and control over the delivery of television programs and/or other multimedia content to end user cable television interface devices located anywhere in the world by personal communication devices present at locations that may be the same as or different from the locations of the end user cable television interface devices.

Other advantages and benefits of the present invention will become apparent upon reading and understanding the present specification when taken in conjunction with the appended drawings.

BRIEF DESCRIPTION OF THE DRAWINGS

FIGS. 16A-E display a flowchart representation of a system access method in accordance with the example embodiment of the present invention.

FIGS. 18A-E display a flowchart representation of a video on demand method in accordance with the example embodiment of the present invention.

DETAILED DESCRIPTION OF THE DRAWINGS

Figure 1:
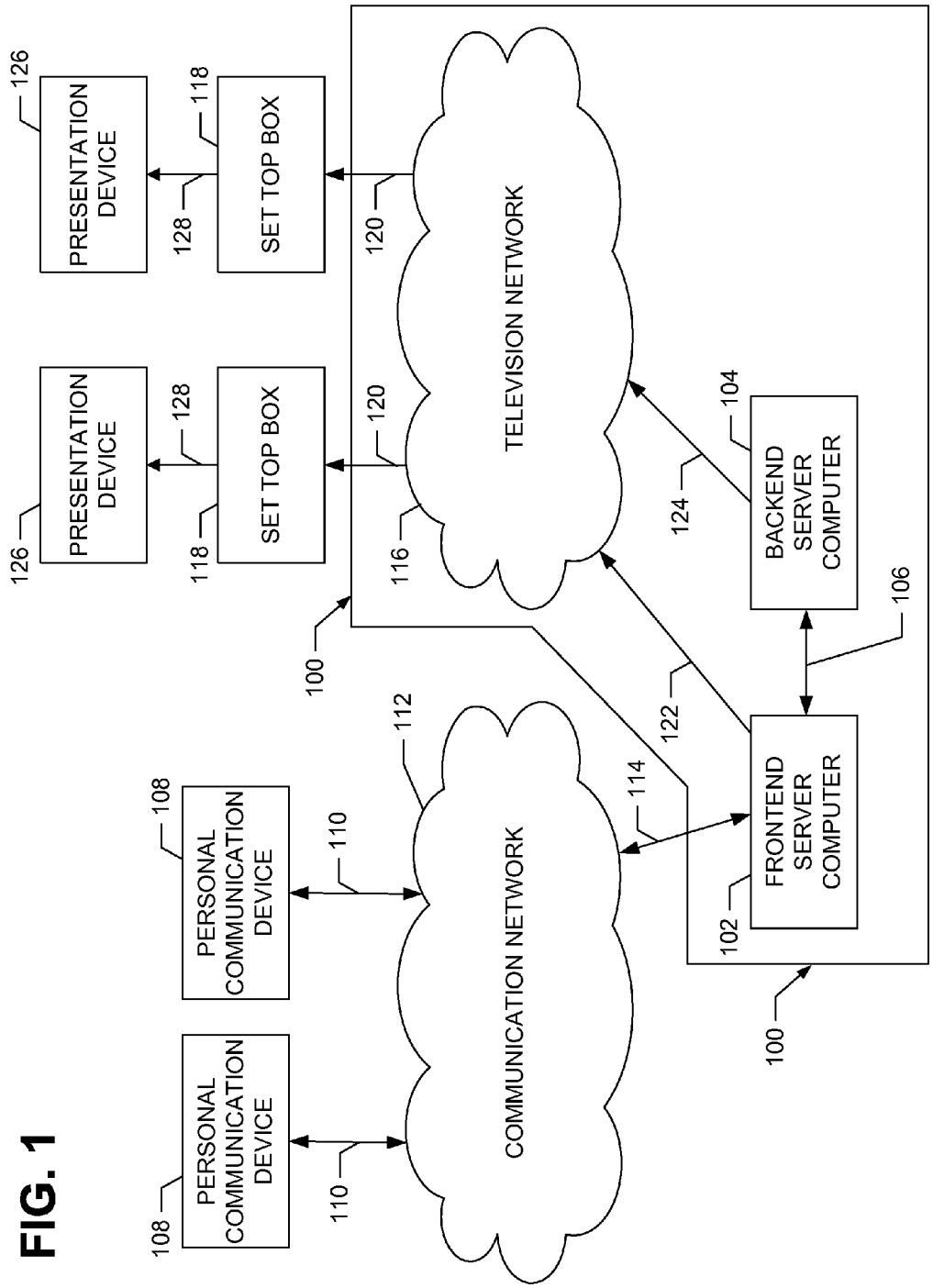
FIG. 1 displays a block diagram representation of a system for providing multimedia content via a cable television distribution network in response to input from a personal communication device in accordance with an example embodiment of the present invention.

Referring now to the drawings in which like numerals represent like elements or steps throughout the several views, FIG. 1 displays a block diagram representation of a system, including apparatuses and methods, for providing multimedia content via a cable television distribution network in response to input from a personal communication device, in accordance with an example embodiment of the present invention (referred to herein as the "system 100"). The system 100 provides, in response to user input, information identifying and describing multimedia content and schedules, or guides, of days/times when such multimedia content is available for communication to a set top box 118 and subsequent presentation via a presentation device 126. According to the example embodiment, such multimedia content may be in the form of television programming with such schedules, or guides, being often referred to as "program guides". The system 100 also provides, in response to user input, information identifying and describing other multimedia content that is available for communication to a set top box whenever the user desires to be presented with such multimedia content (e.g., on demand). According to the example embodiment, such other multimedia content may be in the form of audio-visual content such as, without limitation, movies, music, live or pre-recorded sports events, live or pre-recorded musical concerts, live or pre-recorded plays, live or pre-recorded fitness training sessions, video games, and other forms of audio-visual content that may be accessed using services provided by a cable television service provider such as "video on demand" or "audio on demand". Generally, multimedia content including both video and audio portions is referred to herein as "video", while multimedia content including only an audio portion is referred to herein as "audio".

After presenting a user with information and/or schedules pertaining to the available multimedia content, the system 100 receives a selection from the user of particular multimedia content and responsive thereto, communicates the selected multimedia content via the system's cable distribution television network 116 to a set top box 118 associated with a connected device for presenting received multimedia content (also sometimes referred to herein as a "presentation device 126") such as a television set. The set top box 118 delivers the multimedia content to such presentation device 126 which, in turn, presents the multimedia content to the user. During the provision of information and/or schedules pertaining to available multimedia content and during the delivery of selected multimedia content to the set top box 118, the system 100 may receive input from the user controlling the delivery and responsive thereto, modifies the delivery in accordance with the user's input. For example and not limitation, such modifications may include: the pausing, stopping, or re-starting of delivery; changes to the speed and/or direction of delivery (e.g., fast forwarding, super fast forwarding, fast reversing, or super fast reversing of playback); and, changes to the audio sound level associated with delivery.

The system 100 provides such capabilities and functionality absent the identifying information, descriptive information, and/or schedules being provided to the user via the cable television distribution network 116 or set top box 118, and absent the user inputs being received from the user via a set top box 118 or cable television distribution network 116. Instead, the identifying information, descriptive information, schedules, and user inputs are provided and received, as the case may be, via a portable, handheld personal communication device 108 (sometimes referred to herein as a "personal communication device 108") appropriately configured with system computer software and a data communication network 112 other than a cable television distribution network 116. By virtue of its configuration and method of operation, the system 100 reduces the need for set top boxes 118 configured with proprietary, hard to modify manufacturer owned software that must receive, store and cause the presentation of television program guides and multimedia content related information, thereby enabling the use of less sophisticated, less complex, and less expensive set top boxes 118. By shifting much of the functionality previously provided by set top boxes 118 to the personal communication device 108 of a user, much of the engineering, production, and maintenance costs associated with set top boxes 118 are transferred from cable television service providers to the manufacturers or owners of the personal communication devices 108. In addition, because the functions provided by a personal communication device 108 may be maintained and updated through computer software downloads and updates provided to the personal communication device 108 by cable television service providers, there is less need to update the software of set top boxes 118, thereby reducing the dependence of cable television service providers on set top box manufacturers who maintain and control the proprietary software of their set top boxes 118.

The system 100, as configured according to the example embodiment, comprises one or more frontend server computer(s) 102 and one or more backend server computer(s) 104 that are communicatively connected via bi-directional communication links 106 for the communication of data therebetween. Personal communication devices 108 communicatively connect to a frontend server computer 102 for the bi-directional communication of data therebetween. The personal communication devices 108 and frontend server computer 102 connect for such communication by respective communication links 110, communication network 112, and communication links 114. The personal communication devices 108 comprise wireless personal communication devices 108 configured to executed applications stored therein and to send, receive, process, present, and store messages, information and/or data.

According to the example embodiment, communication network 112 (also sometimes referred to herein as "data communication network 112") comprises a data communication network such as, but not limited to, the data communication network commonly referred to as the Internet. Communication links 110 include, in accordance with the example embodiment, wireless communication links compatible and operable with the personal communication devices 108 and communication network 112 for bi-directional data communication. Communication links 114 include, according to the example embodiment, wired communication links for bi-directional data communication that are compatible and operable with the frontend server computer(s) 102 and communication network 112.

It should be appreciated that other communication networks and other types of communication links may be utilized in other embodiments. It should also be appreciated that when a message, information and/or data is described herein as being communicated between a personal communication device 108 and a frontend server computer 102, the message, information and/or data is communicated between the personal communication device 108 and the frontend server computer 102 via communication network 112 and communication links 110, 114. Additionally, it should be appreciated that when a message, information and/or data is described herein as being communicated between a frontend server computer 102 and a backend server computer 104, the message, information and/or data is communicated between the frontend server computer 102 and backend server computer 104 via communication links 106. In addition, it should be appreciated that when a message, information and/or data is described herein as being communicated between a personal communication device 108 and a backend server computer 104, the message, information and/or data is initially communicated to the frontend server computer 102 via communication network 112 and communication links 110, 114 and then communicated, or forwarded, to backend server computer 104 via communication links 106.

The system 100 further comprises a cable television distribution network 116 (also sometimes referred to herein as "television distribution network 116" or "television network 116"). A plurality of set top boxes 118 (also sometimes referred to herein as "end user cable television network interface devices 118") communicatively connect to the television distribution network 116 via communication links 120. The television distribution network 116 is also communicatively connected to the one or more frontend server computer(s) 102 by communication links 122 and to the one or more backend server computer(s) 104 by communication links 124. Acting together, communication links 122, television distribution network 116, and communication links 120 communicate data and/or messages corresponding to control commands for the set top boxes 118 from a frontend server computer 102 to the set top boxes 118. When received and acted on by the set top boxes 118, the control commands enable a frontend server computer 102 to control operation of certain functions of the set top boxes 118. For example and not limitation, a frontend server computer 102 may cause a set top box 118 to set its television signal tuner to a particular channel, change the tuner's channel incrementally up or down, or change the volume of audio signals output by the set top box 118 incrementally up or down, by sending an appropriate control command to the set top box 118.

Also acting together, communication links 124, television distribution network 116, and communication links 120 communicate data representative of multimedia content, messages, and/or control commands to the set top boxes 118 from a backend server computer 104. The multimedia content is then processed by the set top boxes 118 and communicated to respective presentation devices 126 (such as, without limitation, television sets, monitors, displays, amplifiers, speakers, earphones, and headsets) that are communicatively connected to respective set top boxes 118 via communication links 128. The presentation devices 126 present the received multimedia content to users thereof. The multimedia content may, according to the example embodiment, include video and/or audio, alone or in combination, and be provided by cable television service providers as part of television programming, video on demand (including, without limitation, free and/or pay-per-view movies, sports events, musical concert events, fitness training videos, and plays), audio on demand, digital video recorder, and other multimedia content related services.

The personal communication devices 108, described briefly above, comprise portable, handheld, wireless personal communication devices 108 that are configured to execute computer software programs (e.g., including a plurality of computer software instructions) stored therein, to: receive user inputs; to present multimedia content, selection options, and other information and/or data to a user thereof; to receive and store applications 216 and application skins 218 downloaded from a frontend server computer 102, and to bi-directionally communicate messages, information, and/or data via communication network 112. Such computer software programs may also enable the personal communication devices 108 to send and receive electronic mail, to manage contacts, to manage appointments and calendars, and to access the Internet. The personal communication devices 108 are, typically, also operable to receive incoming and make outgoing telephone calls via a wireless telecommunication network. Example personal communication devices 108 include, but are not limited to, wireless smartphone communication devices such as the iPhone™ available from Apple, Inc. of Cupertino, Calif. and the BlackBerry Storm™ available from Research In Motion Limited of Ontario, Canada.

Figure 2:
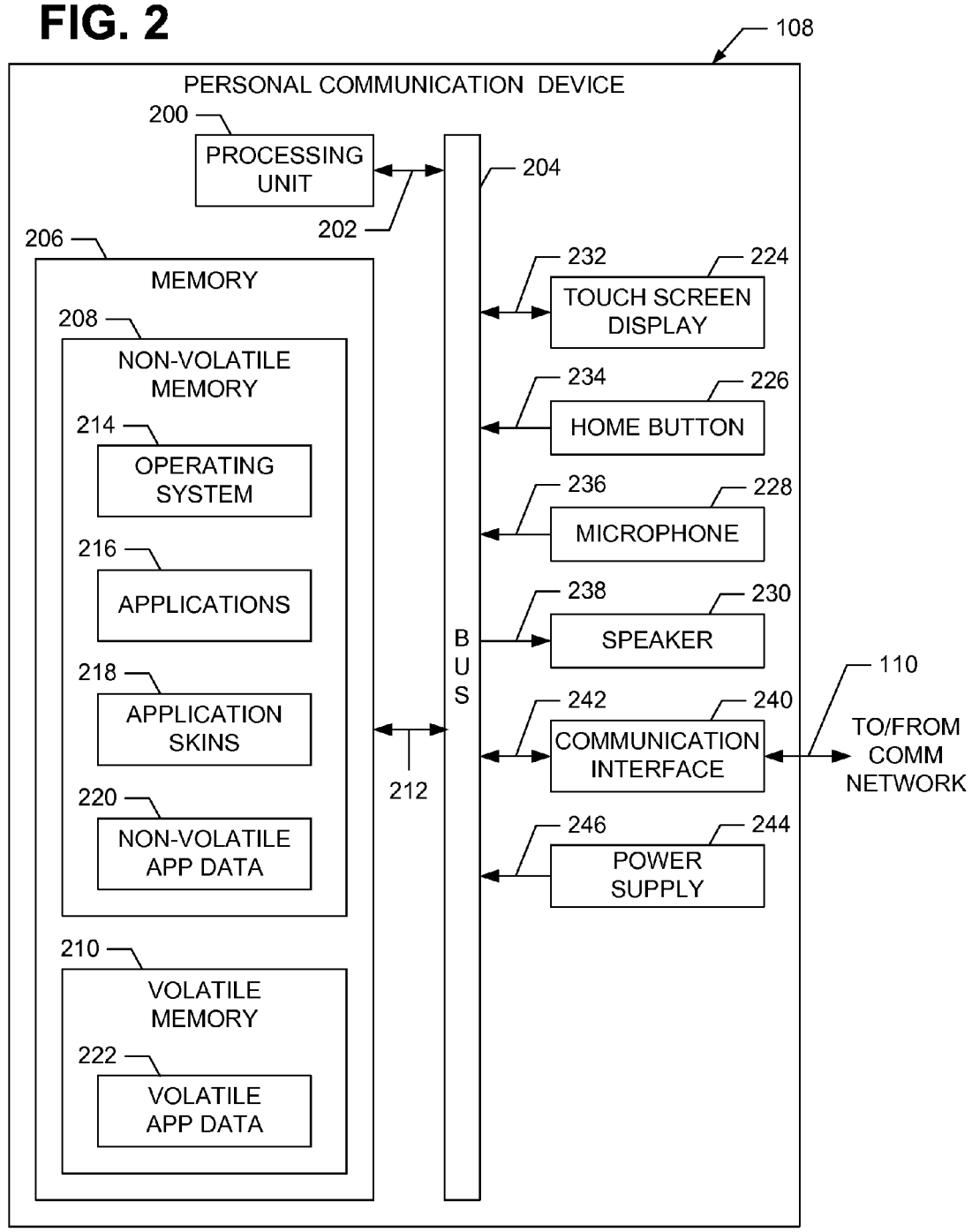
FIG. 2 displays a block diagram representation of a personal communication device in accordance with the example embodiment of the present invention.

FIG. 2 displays a block diagram representation of a personal communication device 108 in accordance with an example embodiment of the present invention. Personal communication device 108 comprises a processing unit 200 that is communicatively connected to a bus 202 via communication link 204 for the bi-directional communication of data with other components of the personal communication device 108.

The processing unit 200 is adapted to execute computer software instructions, causing the personal communication device 108 to perform according to the various methods described herein. The processing unit 200 may comprise a microprocessor, arithmetic logic unit (ALU), application specific integrated circuit (ASIC), or other similar electronic device having similar capabilities, alone or in combination. The bus 202 comprises a plurality of bi-directional communication paths for the bi-directional communication of computer software instructions, data, and various other control signals necessary for operation of the personal communication device 108.

The personal communication device 108 also comprises a memory 206, including non-volatile memory 208 and volatile memory 210. The memory 206 is communicatively connected to bus 202 for the bi-directional communication of computer software instructions, address, data and control signals with the bus 202 and other personal communication device components connected to the bus 202, through one or more bi-directional communication links 212. Non-volatile memory 208 generally stores information and/or data that will not be lost when electrical power to the non-volatile memory 208 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 210 typically stores information and/or data for a temporary period of time, as such information and/or data that will be lost when electrical power is no longer supplied to the volatile memory 210. Examples of volatile memory include, but are not limited to, non-battery backed up random access memory devices.

According to the example embodiment, non-volatile memory 208 stores a plurality of computer software instructions of an operating system 214 that, when delivered to and executed by processing unit 200, enable the processing unit 200 and other personal communication device components to perform various actions and provide the basic functionality necessary to implement the methods described herein. Non-volatile memory 208 also stores pluralities of computer software instructions of respective applications 216 that enable and cause the personal communication device 108 to perform certain functions associated with the applications 216. When an application 216 is selected for execution by a user of the personal communication device 108 and/or when the application's computer software instructions are communicated to and executed by the processing unit 200, the computer software instructions cause the personal communication device 108 to operate according to the selected application 216, thereby implementing the methods described herein and other methods not described herein.

The applications 216 comprise a portion of system 100 and are downloaded to a user's personal communication device 108 after a user has become a customer of the cable television service provider and established a financial account with the cable television service provider via which the customer is charged for use of the services provided by the cable television service provider using the system 100 described herein. Upon becoming a customer, the cable television service provider assigns and provides user authentication information to the user. Using the assigned authentication information, the user may download the various applications 216 and application skins 218 (that also comprise a part of system 100) described herein to his/her personal communication device 108 from the frontend server computer 102 or other server computer of the system 100 via communication network 112.

The applications 216 include, for example and not limitation: a "main" or "home" application 216A for presenting a user, via a personal communication device 108, with other applications 216 available for selection and use via the personal communication device 108; a system access application 216B for enabling a user to provide user authentication information to the system 100, for enabling the system 100 to authenticate or not authenticate the user, for presenting a list of set top boxes 118 available for selection and use by the user in connection with the personal communication device 108, and upon authentication and set top box 118 selection, for presenting a user with applications 216 related to services provided by the cable television service provider that are available for selection and use via the personal communication device 108; and, a program guide application 216C for presenting a schedule of television programs by time and channel that are available for selection via the personal communication device 108 and for delivery to an identified set top box 118 for viewing on a connected presentation device 126.

The applications 216 further include, but are not limited to, a video on demand application 216D for presenting categories of videos and information identifying individual videos within the categories that are available for selection via the personal communication device 108 and for delivery to an identified set top box 118 for subsequent viewing on a connected presentation device 126. The video on demand application 216D enables the user to control the playback of a video (e.g., play, fast forward, super fast forward, fast reverse, super fast reverse, pause, stop, volume up, volume down, and volume mute) via the personal communication device 108 or through use of a remote control operable with the set top box 118 to which the video is delivered.

Without limitation, the applications 216 still further comprise a digital video recorder (DVR) application 216E for (i) via the personal communication device 108, scheduling or causing immediate recording of a television program by/on an identified set top box 118 having digital video recorder (DVR) capabilities, and (ii) presenting a list of already recorded television programs available for selection via the personal communication device 108 and delivery to a set top box 118 for subsequent viewing on a connected presentation device 126. Control over the playback (e.g., play, fast forward, super fast forward, fast reverse, super fast reverse, pause, stop, volume up, volume down, and volume mute) of the recorded television programs is provided by the user via the personal communication device 108.

Still further and absent limitation, the applications 216 include: an audio on demand application 216F for presenting categories of audios and information identifying individual audios within the categories that are available for (i) selection via the personal communication device 108, for presenting radio stations and information identifying individual radio stations, and (ii) playing the selected audios and/or radio stations through a presentation device 126 with control (e.g., play, fast forward, super fast forward, fast reverse, super fast reverse, pause, stop, volume up, volume down, and volume mute) thereof being provided by the user via the personal communication device 108; a set top box (STB) add/edit application 216G for enabling a user to input, view, and edit a name and associated unique identification information (including, but not limited to, a media access control (MAC) address) for each set top box 118 (and, hence, connected presentation device 126) with which the user desires to use the personal communication device 108; an account management application 216H for presenting information from and pertaining to the user's financial account with the cable television service provider on a presentation device 126 and/or the personal communication device 108, and for receiving inputs and/or edits thereto via the personal communication device 108; and, various other applications 216I-216Q available now or in the future.

Non-volatile memory 208 additionally stores data representative of application skins 218 that are employed by the applications 216 to interface and interact with a user of the personal communication device 108 via the device's touch screen display 224, "home" button 226, microphone 228, and speaker 230 described below. Each application 216 may have one or more application skins 218 constituting user interfaces that present various user selectable options, buttons and/or application data 220 to a user of the personal communication device 108 via touch screen display 224. The application skins 218 are described in more detail below with reference to FIGS. 3-13.

In addition, non-volatile memory 208 stores non-volatile application data 220 that is used by the applications 216 during their execution and/or that may be displayed or presented to a user during execution of an associated application 216. Such non-volatile application data 220 may include, but not be limited to: authentication information including user names and passwords for use in accessing, or controlling access to, the system 100; program guide data corresponding to television programs available for viewing at various times and on various channels; video on demand data identifying categories of non-television program video and non-television program video available for viewing upon selection by the user; digital video recorder (DVR) data corresponding to video that has been recorded already (and is available for viewing) or that is scheduled for recording by a set top box 118; audio on demand data identifying audio available for listening to at various times and on various channels upon selection by the user; set top box configuration data (including, without limitation, identification information uniquely identifying each set top box 118 with which a user desires to interact via the personal communication device 108 or have multimedia content delivered to); account management data including, perhaps, a user's account number and/or personal identification number (PIN) used to access the user's financial account with the cable television service provider and/or charge, to such account, the cost of video on demand or audio on demand services provided to a user; and other data utilized by applications 216.

Volatile memory 210 stores volatile application data 222 that is created and/or used by the applications 216 during their execution. Volatile application data 222 may include, for example, information identifying a user selection, information input by and received from a user via touch screen display 224 or other input component, results of a calculation, messages being formed for communication to frontend server computer 102 via communication network 112, messages received from frontend server computer 102 via communication network 112, and other information and/or data.

Figure 3:
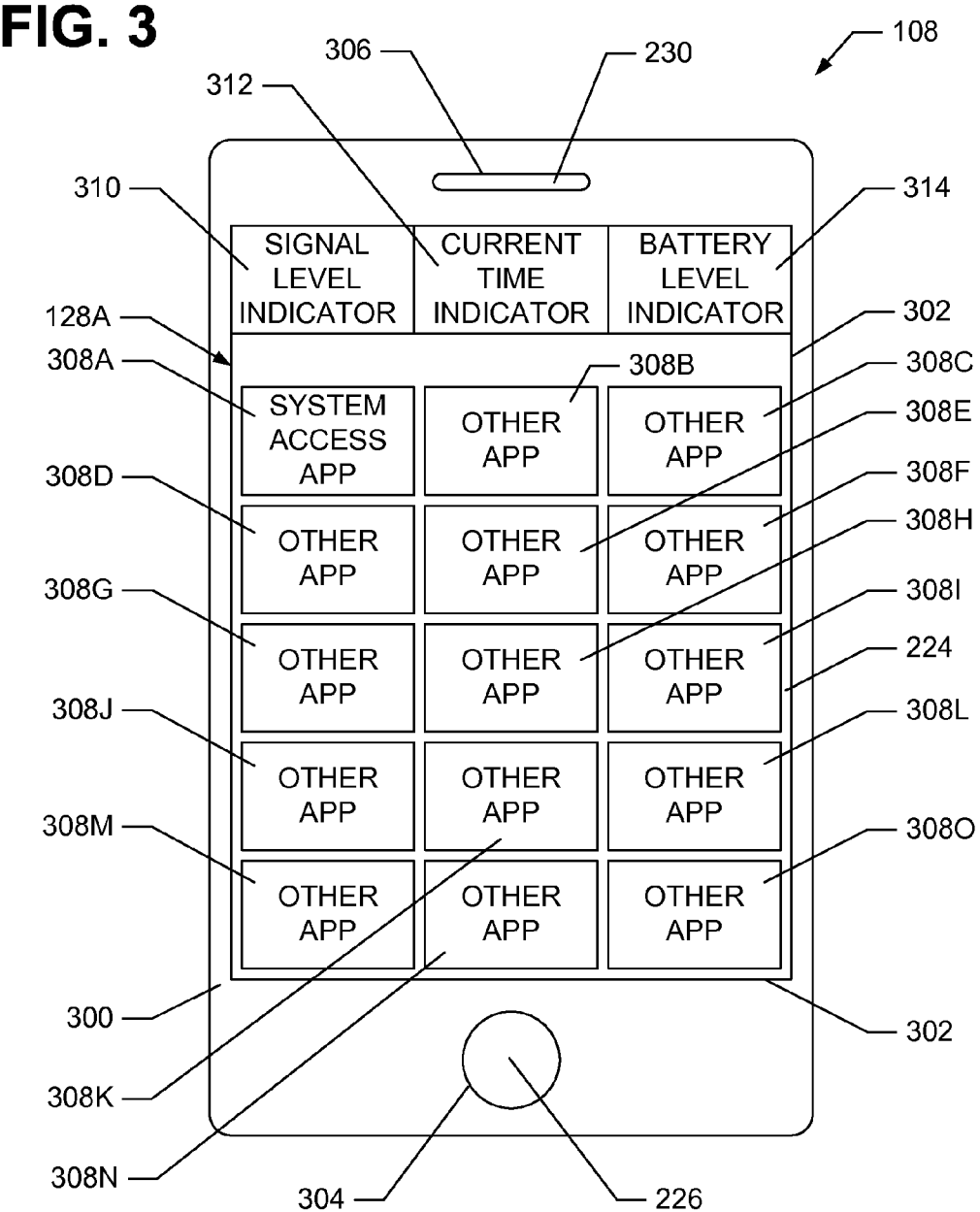
FIG. 3 displays a front, schematic view of a personal communication device and a main application skin thereof in accordance with the example embodiment of the present invention.

The personal communication device 108, in accordance with the example embodiment and as alluded to above, further comprises a touch screen display 224, a "home" button 226, a microphone 228, and a speaker 230 that are connected, respectively, to bus 204 by bi-directional communication link 232 and unidirectional communication links 234, 236, and 238. Touch screen display 224 comprises an input/output device that displays data received from processing unit 200 via bus 204 and communication links 202, 232. The touch screen display 224 also receives user inputs and/or selections made by a user touching or depressing the touch screen display 224 using a finger, stylus or other implement at an appropriate location and communicates the inputs and/or selections to processing unit 200 via bus 204 and communication links 202, 232. The "home" button 226 comprises a switch depressible by a user of personal communication device 108 that, when depressed, communicates a signal to processing unit 200 via bus 204 and communication links 202, 234. Upon receipt of the signal, the processing unit 200 executes the computer software instructions of the "main" or "home" application 216A, causing the touch screen display 224 to display a "main" or "home" application skin 218A as illustrated in FIG. 3 described below. The microphone 228 receives speech and other audible inputs from a user of the personal communication device 108 and converts the inputs to representative data that is communicated to processing unit 200 via bus 204 and communication links 202, 236. In contrast, the speaker 230 receives data representing audible sounds from processing unit 200 via bus 204 and communication links 202, 238 and converts the data into audible sounds. Together with other components described and not described herein, the microphone 228 and speaker 230 enable use of the personal communication device 108 also as a wireless telephone.

Further, the personal communication device 108 includes a communication interface 240 adapted for sending messages to frontend server computer 102 and receiving messages from frontend server computer 102, via communication network 112 and bi-directional communication links 110, 114. Generally, the messages sent to the frontend server computer 102 include data representative of user selections, user inputs, user authentication data, set top box identification and related configuration information, and other information. The messages received from the frontend server computer 102 typically include data representative of program guides, selections of video available as part of video on demand services, selections of audio available as part of audio on demand services, account information related to a user's account with the cable television service provider, and other information. Still further, the personal communication device 108 comprises a power supply 244 connected to bus 204 via signal path 246 that supplies electrical energy to the various components of the personal communication device 108. The power supply 244 generally includes one or more rechargeable batteries for storing and supplying the electrical energy.

FIG. 3 displays a front, schematic view of a personal communication device 108 with a main application skin 218A displayed on the personal communication device's touch screen display 224 in accordance with the example embodiment of the present invention. The personal communication device 108 has a partial enclosure 300 within which the various components of FIG. 2 reside and are held in place. The partial enclosure 300 defines an opening 302 through which the touch screen display 224 protrudes slightly. The partial enclosure 300 also defines an aperture 304 through which the "home" button 226 is accessible. The "home" button 226 may be depressed by the user, at any time, to cause the processing unit 200 to initiate execution of the "main" or "home" application 216A. Additionally, the partial enclosure 300 defines a slot 306 behind which speaker 230 is positioned so as to enable audible sound produced by the speaker 230 to propagate through slot 306 and outside of the partial enclosure 300.

As seen in FIG. 3, the personal communication device 108 has the "main" or "home" application skin 218A displayed on the personal communication device's touch screen display 224. The "main" or "home" application skin 218A is displayed on the personal communication device's touch screen display 224 when the processing unit 200 executes the "main" or "home" application 216A. The "main" or "home" application skin 218A includes a plurality of displayed icons 308 with each icon 308 corresponding in one-to-one correspondence to an application 216 that may be selected by the user for execution by processing unit 200. For example, icon 308A is associated in one-to-one correspondence with the system access application 216B such that when the user selects icon 308A using a finger, stylus or other implement to depress the touch screen display 224 in the area of icon 308A, the personal communication device's processing unit 200 initiates execution of the system access application 216B. The other icons 308B-308O are, also for example, associated in one-to-one correspondence with respective other non-system applications such that when the user similarly selects one of the other icons 308B-308O, the personal communication device's processing unit 200 begins execution of the other application associated with the selected icon 308. Other applications may include, for example, contact information management, electronic mail, music portfolio management and playback, Internet browser, telephone, phone book, dictionary, calculator, flashlight, and numerous other applications. In the example embodiment, the icons 308 each have a generally rectangular shape and are arranged in arranged in a row and column matrix, but it should be appreciated that the icons 308 may have any shape and may be arranged in any manner in other embodiments.

The "main" or "home" application skin 218A (and, for that matter, all other application skins 218) also includes a signal level indicator 310, a current time indicator 312, and a power level indicator 314. The signal level indicator 310 displays, on the touch screen display 224, a visual representation of the strength of a wireless communication signal being received by the personal communication device 108. Higher signal strengths aid in the communication of data between the personal communication device 108 and the communication network 112 via communication links 110. When using personal communication device 108, a user may use the signal level indictor 310 to position the personal communication device 108 in a location having the highest possible signal strength in order to improve the quality of communications between the personal communication device 108 and the communication network 112. The current time indicator 312 displays the current clock time on the touch screen display 224, while the power level indicator 314 displays a visual representation of the current level of electrical energy remaining in the power supply 244 on the touch screen display 224.

Figure 4:
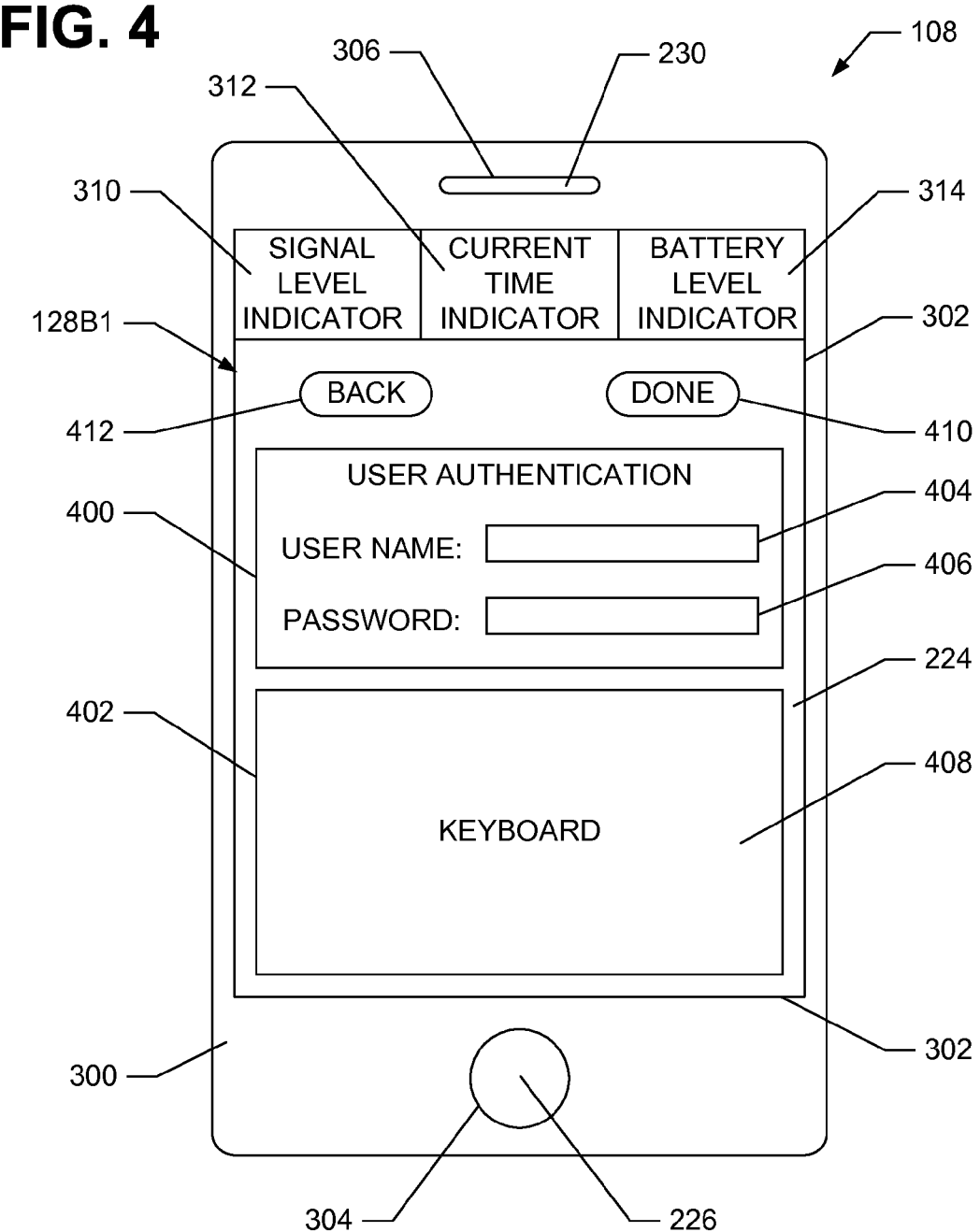
FIG. 4 displays a front, schematic view of a personal communication device and a user authentication skin thereof in accordance with the example embodiment of the present invention.

FIG. 4 displays a front, schematic view of a personal communication device 108 with a first system access skin 218B1 displayed on the personal communication device's touch screen display 224 in accordance with the example embodiment of the present invention. The first system access skin 218B1 (also sometimes referred to as a "user authentication skin 218B1") is displayed by processing unit 200 on the touch screen display 224 when the processing unit 200 initiates execution of the system access application 216B. The first system access skin 218B1 provides a user interface for the personal communication device 108 to obtain user authentication information (e.g., a user name and password) input by the user for use in determining whether or not the user is an authorized user of the system 100. This process is sometimes referred to herein as "user authentication" or simply "authentication". If the user cannot be authenticated as an authorized user of the system 100, the user is denied access to the system 100 and its features.

The first system access skin 218B1 includes a user authentication panel 400 and a keyboard panel 402. The user authentication panel 400 has a user name input control/box 404 and a password control/box 406 for respectively receiving a user name and password that have been previously assigned to or selected by the user. According to the example embodiment, the keyboard panel 402 has a keyboard 408 having a plurality of keys (although shown schematically as a rectangle in FIG. 4 without individual keys being illustrated) arranged in a QWERTY style key format with each alphabetic character and number being associated with a respective key. By selecting the user name or password control/box 404, 406 and then selecting the appropriate keys from the keyboard 408 in an order appropriate for the user name or password, as the case may be, a user inputs his/her user name and password.

In addition to the user authentication and keyboard panels 400, 402, the first system access skin 218B1 includes a "done" button 410 and a "back" button 412 that may be selected by a user. The "done" button 410 is generally selected by the user once the user has input his/her user name and password into the respective user name control/box 404 and password control box 406. Selection of the "done" button 410 signals the processing unit 200 to communicate the input user name and password, as user authentication information, in a message to the frontend server computer 102 for authentication. If the input user name and password are determined to be valid by the frontend server computer 102 and the personal communication device 108 receives a communication to such effect, the frontend server computer 102 establishes a communication session with the personal communication device 108 and the processing unit 200 displays the second system access skin 218B2 on the touch screen display 224. Selection of the "back" button 412 signals the processing unit 200 to terminate access to the system 100 and the communication session with the frontend server computer 102 and to again display the "main" or "home" application skin 218A.

Figure 5:
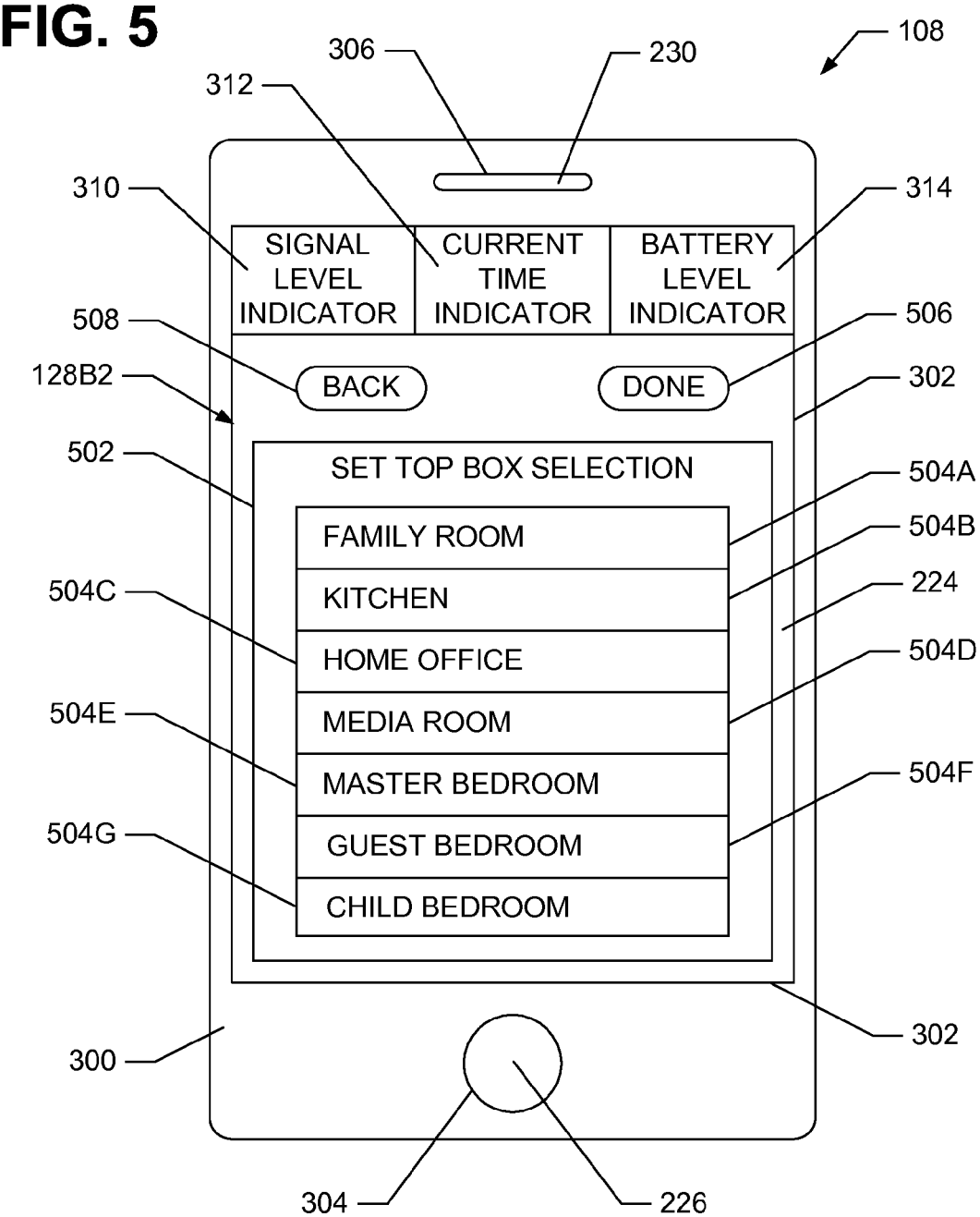
FIG. 5 displays a front, schematic view of a personal communication device and a set top box selection skin thereof in accordance with the example embodiment of the present invention.

FIG. 5 displays a front, schematic view of a personal communication device 108 with a second system access skin 218B2 displayed on the personal communication device's touch screen display 224 according to the example embodiment of the present invention. The second system access skin 218B2 (also sometimes referred to as a "set top box selection skin 218B2") is generally displayed by processing unit 200 on the touch screen display 224 when the processing unit 200 (i) receives a communication from the frontend server computer 102 indicating that the user has been authenticated or confirmed as an authorized user of the system 100 and (ii) there is more than one set top box 118 that has been previously identified to and configured with the personal communication device 108. If only one set top box 118 has been identified to and configured with the personal communication device 108, the second system access skin 218B2 is not displayed since, by default, user interaction during the then current communication session can only be with the sole set top box 118 previously identified to and configured with the personal communication device 108.

The second system access skin 218B2 provides a user interface for the personal communication device 108 to obtain a selection of a set top box 118 that the user desires to use for the presentation of multimedia content or with respect to which the user desires to interact via the personal communication device 108. For example, if a user desires to watch a presentation device 126 present at a location at which the user is also present, the user will select the set top box 118 connected to the presentation device 126. If, however, the user desires to interact with a set top box 118 present at a location at which the user is not also present to, say, schedule the recording of a television program via the set top box's digital video recorder, the user may select such a set top box 118 from the second system access skin 218B2. Thus, by virtue of the system 100, the user can use or interact with a particular set top box 118 while being present at virtually any location where the personal communication device 108 can communicate with communication network 112. This allows the user to remotely control and/or interact with multiple set top boxes 118 at different locations as desired by the user.

The second system access skin 218B2 includes a set top box selection panel 500 that displays information uniquely identifying and associated with each set top box 118 that the user has previously identified to the personal communication device 108 via the set top box add/edit application 218G. According to the example embodiment, the set top box selection panel 500 has a list control 502 having a plurality of rows 504 with each row 504 corresponding in one-to-one correspondence with a set top box 118 such that each row 504 includes identifying information for a different set top box 118 available for selection by the user. Typically, the identifying information for each set top box 118 comprises a name of significance to the user and assigned to each respective set top box 118 that may indicate the set top box's respective location, but in other embodiments, the identifying information may comprise other information. Also, in other embodiments, each set top box 118 may be represented by a unique icon or other symbol that may be arranged in an alternative manner within the set top box selection panel 500.

The second system access skin 218B2 further includes a "done" button 506 and a "back" button 508 that are available for selection by a user. The user generally selects the "done" button 506 after the user has selected a set top box 118 for use or interaction with by depressing the touch screen display 224 in the area of the desired selection using a finger, stylus or other implement. Selection of the "done" button 506 signals the processing unit 200 to communicate information uniquely identifying the selected set top box 118 (generally including, but not limited to, the unique media access control (MAC) number assigned to the set top box 118 by its manufacturer) in a message to the frontend server computer 102. This information is used by the frontend server computer 102 to send messages, commands, and other information and/or data to the selected set top box 118 via communication links 122 and/or backend server computer 104 via communication links 106, when necessary and/or appropriate. Selection of the "back" button 508 signals the processing unit 200 to end set top box selection and to again display the first system access skin 218B1 on the touch screen display 224.

Figure 6:
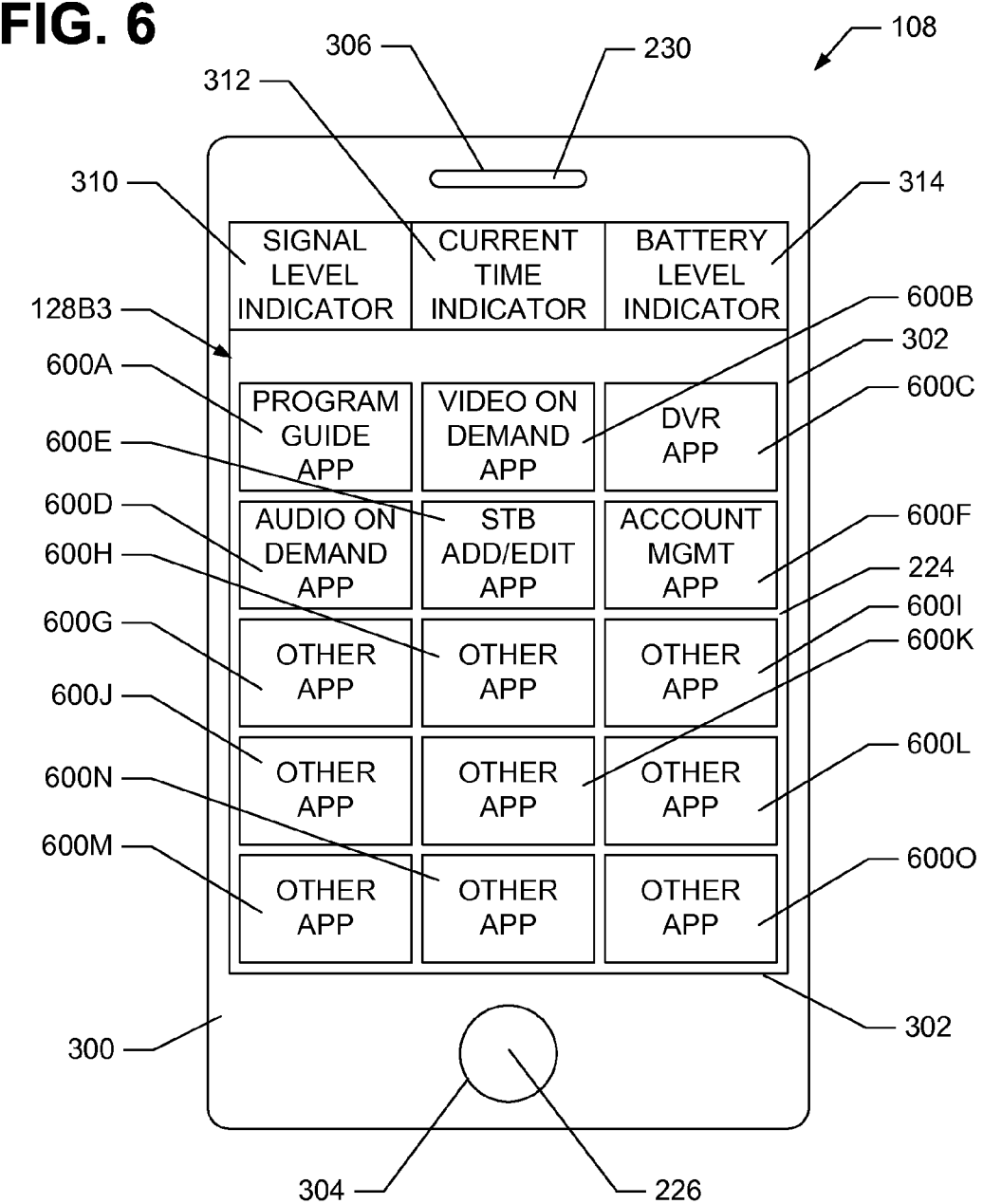
FIG. 6 displays a front, schematic view of a personal communication device and a multimedia application selection skin thereof in accordance with the example embodiment of the present invention.

FIG. 6 displays a front, schematic view of a personal communication device 108 with a third system access skin 218B3 displayed on the device's touch screen display 224 according to the example embodiment of the present invention. The third system access skin 218B3 (also sometimes referred to as a "multimedia application selection skin 218B3") is generally displayed by processing unit 200 on the touch screen display 224 (i) when the processing unit 200 receives a message from the frontend server computer 102 indicating that the user has been authenticated or confirmed as an authorized user of the system 100 and only one set top box 118 has been previously identified to the personal communication device 108 via the set top box add/edit application 216G, (ii) when the processing unit 200 has received selections of a set top box 118 and the "done" button 506 via the second system access skin 218B2, or (iii) when the processing unit 200 has received the selection of a "back" button selected from an initial application skin 218 associated with an application 216 such as those identified on the third system access skin 218B3. The third system access skin 218B3 provides a user interface for the personal communication device 108 to obtain a selection of an application 216C-H that the user desires to use or access with respect to a set top box 118.

The third system access skin 218B3 includes a displayed plurality of icons 600 with each icon 600A-F corresponding in one-to-one correspondence to a multimedia application 216C-H that may be selected by the user for execution by processing unit 200. For example, icon 600A is associated in one-to-one correspondence with the program guide application 216C such that when the user selects icon 600A using a finger, stylus or other implement to depress the touch screen display 224 in the area of icon 600A, the personal communication device's processing unit 200 initiates execution of the program guide application 216C. Similarly, icons 600B-600F are associated, respectively, in one-to-one correspondence with the video on demand application 216D, the digital video recorder (DVR) application 216E, the audio on demand application 216F, the set top box (STB) add/edit application 216G, and the account management application 216H. Other icons 600G-600O are associated in one-to-one correspondence with other applications 216I-Q not described herein. Upon selection of an icon 600 by the user using a finger, stylus or other implement to depress the touch screen display 224 in the area of the selected icon 600, the personal communication device's processing unit 200 initiates execution of the application 216 associated with the icon 600. It should be appreciated that while the icons 600 of the example embodiment have a generally rectangular shape and are arranged in a row and column matrix, the icons 600 may have any shape and may be arranged in any manner in other embodiments. It should also be appreciated that other embodiments may not employ icons 600 or similar elements to display or identify the applications 216C-Q that are available for selection by a user.

Figure 7:
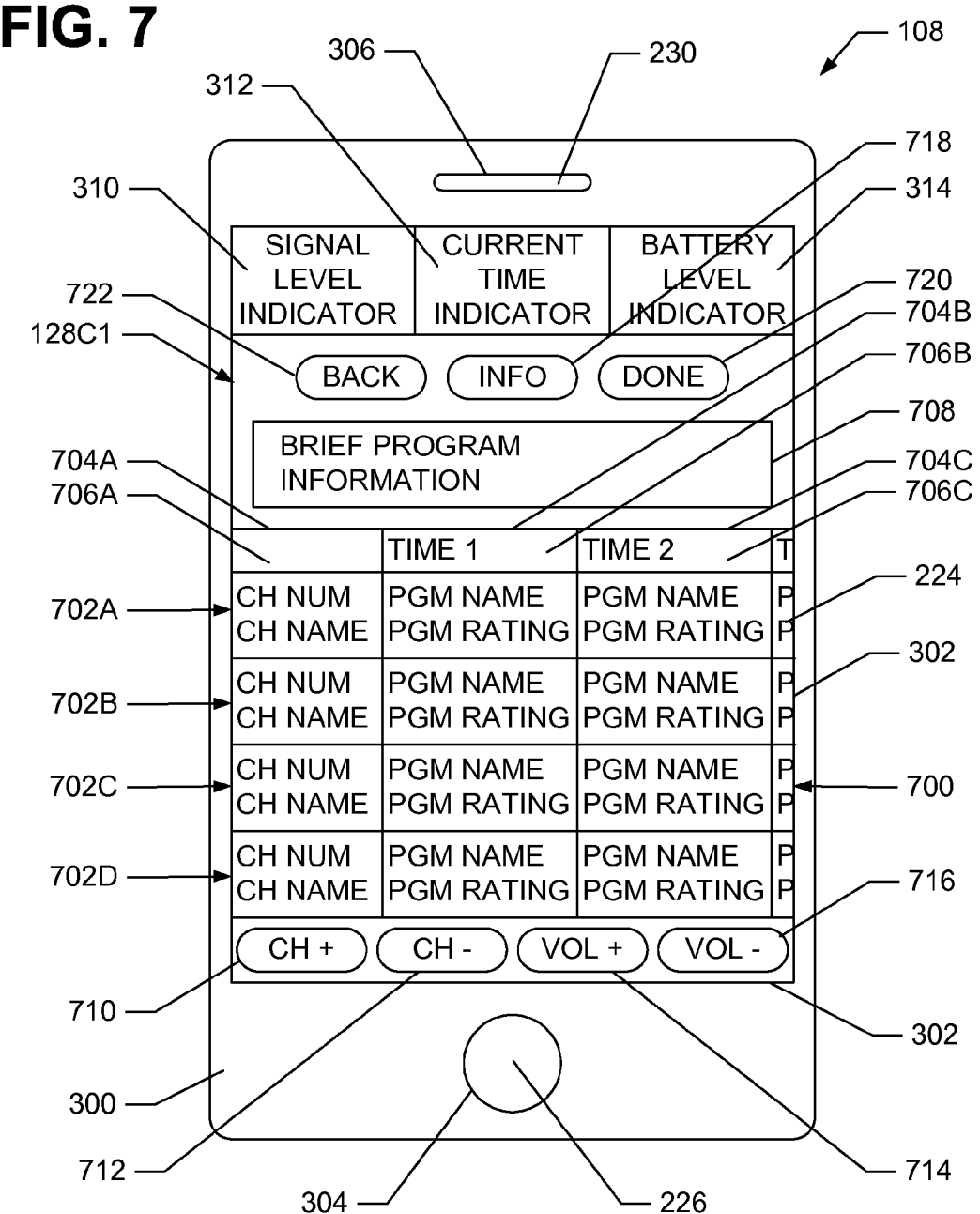
FIG. 7 displays a front, schematic view of a personal communication device and a program selection skin thereof in accordance with the example embodiment of the present invention.

FIG. 7 displays a front, schematic view of a personal communication device 108 with a first program guide skin 218C1 displayed on the device's touch screen display 224 according to the example embodiment of the present invention. The first program guide skin 218C1 (also sometimes referred to as an "program selection skin 218C1") is generally displayed by processing unit 200 on the touch screen display 224 in response to the processing unit 200 receiving a selection of the program guide application 216C via the multimedia application selection skin 218B3 (i.e., selection of icon 600A) and initiating execution of the program guide application 216C. The first program guide skin 218C1 provides a user interface for the personal communication device 108 to display information related to television programs available for viewing and to obtain a selection of a television program that the user desires to be presented on the presentation device 126 connected to (i) a set top box 118 previously selected and identified via set top box selection skin 218B2 or (ii) the lone set top box 118 previously identified to and configured with the personal communication device 108 if no other set top boxes 118 have been identified to and configured with the personal communication device 108 via the set top box (STB) add/edit application 216G.

The first program guide skin 218C1 includes a row and column matrix 700 in which program guide data stored as non-volatile application data 220 in non-volatile memory 208 is presented to a user of the personal communication device 108. The matrix 700 includes a plurality of rows 702 with each row 702 of the matrix 700 corresponding in one-to-one correspondence with a television channel available for viewing on a presentation device 126 connected to a set top box 118 that has been identified to the personal communication device 108 during the then current communication session. A user may scroll through the matrix 700 to view other rows 702 (and, hence, program guide data associated with other channels) by depressing the touch screen display 224 in the area of the matrix 700 with a finger, stylus or similar implement and moving the same up or down in the desired direction of scrolling. In response, the processing unit 200 scrolls the matrix 700 up or down, as the case may be, thereby displaying program guide data associated with other television channels.

The matrix 700 also includes a plurality of columns 704. The first column 704A displays the channel number and channel name in each row 702 for the television channel associated with such row 702. Each of the second column 704B, third column 704C, and remaining columns 704 of the matrix 700 display the program names and associated program parental ratings associated with television programs that are available for viewing on each of the television channels starting at the respective times identified in the column headers 706. Generally, the starting times shown in adjacent column headers 706 differ by one-half hour. Thus, for example and as illustrated in FIG. 7, "Time 1" associated with column 706B differs from "Time 2" associated with column 706C by one-half hour. It should be appreciated, however, that the time difference between adjacent columns 704 of matrix 700 may be more or less than one-half hour, and may or may not be constant in other embodiments.

In a manner to similar to the rows 702, a user may scroll the matrix 700 through all columns 704 other than the first column 704A (which is fixed against horizontal scrolling) to view other columns 704 and, hence, program guide data associated with various starting times. To do so, the user depresses the touch screen display 224 in the area of the matrix 700 with a finger, stylus or other implement and moves the same right or left in the desired direction of scrolling. The processing unit 200, in response thereto, scrolls the matrix 700 right or left, as the case may be, thereby displaying program guide data associated with other starting times. When a user desires to select or identify a television program from the matrix 700 for viewing or for obtaining further information about the television program, the user taps on the touch screen display 224 in the area (e.g., the row and column grid location) of the matrix 700 corresponding to the television program that the user desires to select or identify. In response, the processing unit 200 highlights that area of the touch screen display 224 until a different area is selected or identified by the user.

The first program guide skin 218C1 additionally includes a brief program information panel 708, a channel up button 710, a channel down button 712, a volume up button 714, and a volume down button 716. The processing unit 200 displays, in brief program information panel 708, information about a television program highlighted and selected from the matrix 700 by a user tapping on the touch screen display 224 with a finger, stylus or other implement in the area of the matrix 700 displaying the television program's name. Such information may include, without limitation, the program name, the program's parental rating, the year the program was made, and the program's starting and ending times.

The channel up button 710 and channel down button 712 enable a user to display the television channel having the next higher channel number or the next lower channel number, as the case may be, on the presentation device 126 connected to the set top box 118 then being interacted with via the personal communication device 108 during the communication session. To do so, the user taps the touch screen display 224 in the area of the channel up button 710 or channel down button 712 as desired. In response, the processing unit 200 communicates a message, including information uniquely identifying the particular set top box 118, to the frontend server computer 102 via communication network 112. The frontend server computer 102 then sends an appropriate message/command to the particular set top box 118, via communication links 120, 122 and television network 116, that when interpreted and acted upon by the set top box 118, causes the set top box 118 to increment or decrement by a single channel, as the case may be, the channel tuned to by its tuner.

The volume up button 714 and volume down button 716 allow a user to change the volume of the sound being produced by the presentation device 126 connected to the set top box 118 then being interacted with via the personal communication device 108. Responsive to the user tapping on the touch screen display 224 in the area of the volume up button 714 or volume down button 716, the processing unit 200 communicates a message, including information uniquely identifying the particular set top box 118, to the frontend server computer 102 via communication network 112. The frontend server computer 102, in turn, sends an appropriate command for incrementing or decrementing the volume, as the case may be, to the particular set top box 118, via communication links 120, 122 and television network 116. Upon receiving and interpreting the command, the set top box 118 increments or decrements the sound level of the audio signal being produced and provided to the connected presentation device 126, thereby causing the volume of the sound produced by the presentation device 126 to be increased or decreased. Generally, the amount of increase or decrease in the volume, as the case may be, in response to each message/command received by the set top box 118 is pre-determined.

In addition, the first program guide skin 218C1 includes an "info" button 718, a "done" button 720, and a "back" button 722. Selection of each of these buttons 718, 720, 722 is made by a user tapping the touch screen display 224 in the area around the respective button 718, 720, 722 with a finger, stylus or other implement. In response to the "info" button 718 being selected, the processing unit 200 displays a second program guide skin 218C2 that presents detailed information about an identified or selected television program to a user. The second program guide skin 218C2 is described in more detail below. Selection of the "done" button 720 signals the processing unit 200 to communicate a message to the frontend server computer 102 via communication links 110, 114 and communication network 112, including information uniquely identifying the set top box 118 being interacted with via the personal communication device 108 and information identifying the television channel number selected by the user. Upon receiving such message, the frontend server computer 102 communicates a message/command to the particular set top box 118 and data appropriate to cause the set top box's tuner to tune itself to the television channel selected by the user. After receiving such message/command, the set top box 118 interprets the message/command, extracts the included data, and sets its tuner to tune in the television channel selected by the user. Selection of the "back" button 722 signals the processing unit 200 to end execution of the program guide application 216C and to again display the multimedia application selection skin 218B3 on the touch screen display 224.

Figure 8:
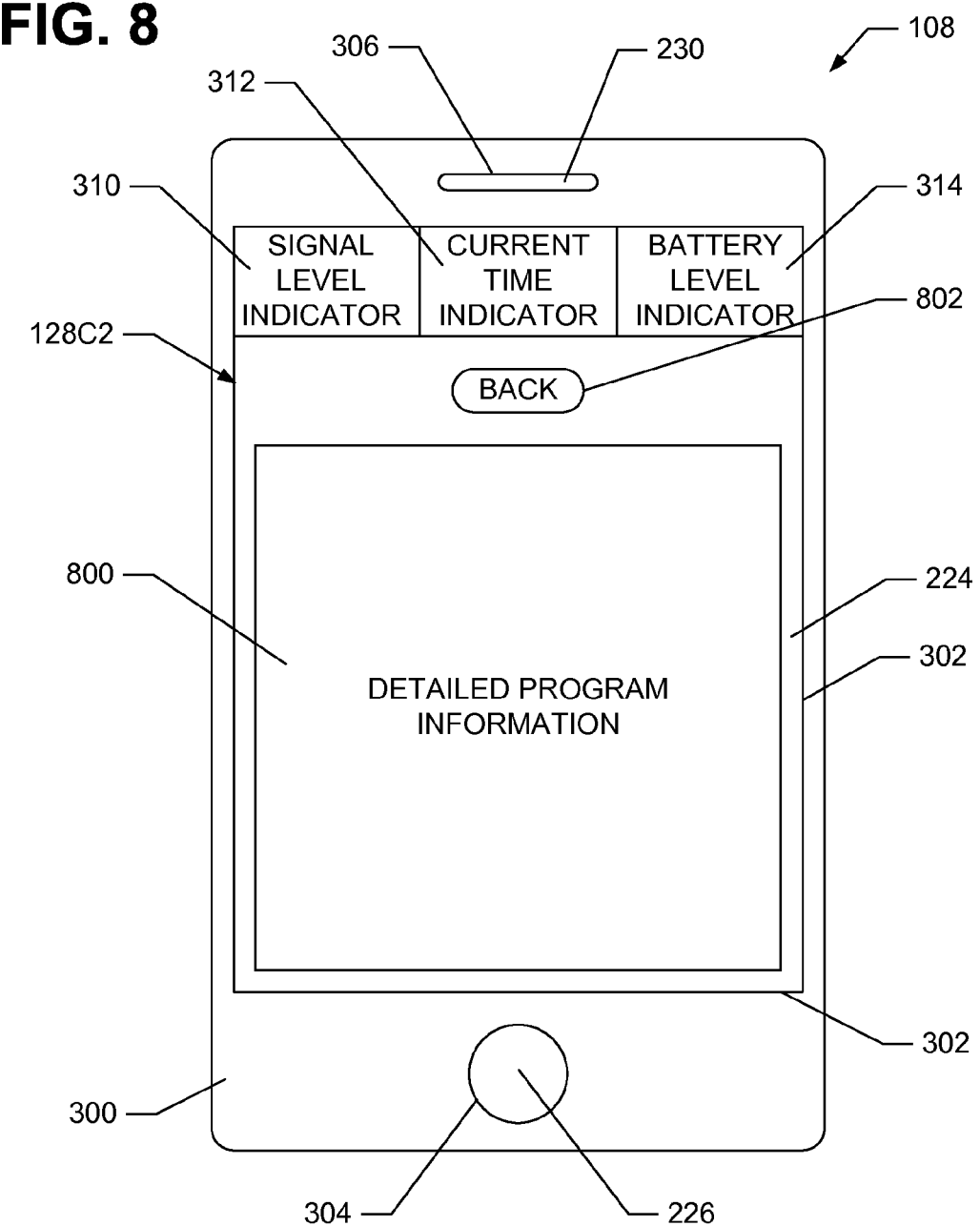
FIG. 8 displays a front, schematic view of a personal communication device and a program information skin thereof in accordance with the example embodiment of the present invention.

FIG. 8 displays a front, schematic view of a personal communication device 108, in accordance with the example embodiment of the present invention, with a second program guide skin 218C2 displayed on the device's touch screen display 224. The second program guide skin 218C2 (also sometimes referred to as a "program information skin 218C2") is generally displayed on the touch screen display 224 by processing unit 200 in response to the processing unit 200 receiving a selection of the "info" button 718 on the first program guide skin 218C1. The second program guide skin 218C2 provides a user interface for the personal communication device 108 to display detailed information about or pertaining to a television program selected or identified by a user via the first program guide skin 218C1 as described above.

The second program guide skin 218C2 includes a detailed information panel 800 and a "back" button 802. The processing unit 200 displays, in detailed information panel 800, detailed information about a television program selected or identified by a user via the first program guide skin 218C1. The detailed information may include different information depending on the television program's type. For example and not limitation, if the television program is a fictional program, the detailed information may include the names of the actors appearing in the program and a description of the program's plot. If the television program is a sports program, the detailed information may include the names of the participants in the sporting event, the location of the sporting event, weather related information if the sporting event is an outside event, and a description of the event. For other program types, the detailed information may vary. Additionally, as an aid to the user, the detailed information panel 800 may display some or all of the information that was displayed in the brief program information panel 708 of the first program guide skin 218C1. If all of the detailed information is not visible in the detailed information panel 800, a user may scroll through the detailed information by depressing the touch screen panel 224 in the area of the detailed information panel 800 with a finger, stylus or other implement and moving the same up or down depending on the desired scrolling direction. In response, the processing unit 200 will scroll the detailed information up or down, as the case may be, within the detailed information panel 800.

The "back" button 802 of the second program guide skin 218C2 enables a user of a personal communication device 108 to return to the first program guide skin 218C1. Selection of the "back" button 802 by a user depressing the touch screen display 224 in the area of the "back" button 802 with a finger, stylus or other implement, signals the processing unit 200 to re-display the first program guide skin 218C1 on the touch screen display 224.

Figure 9:
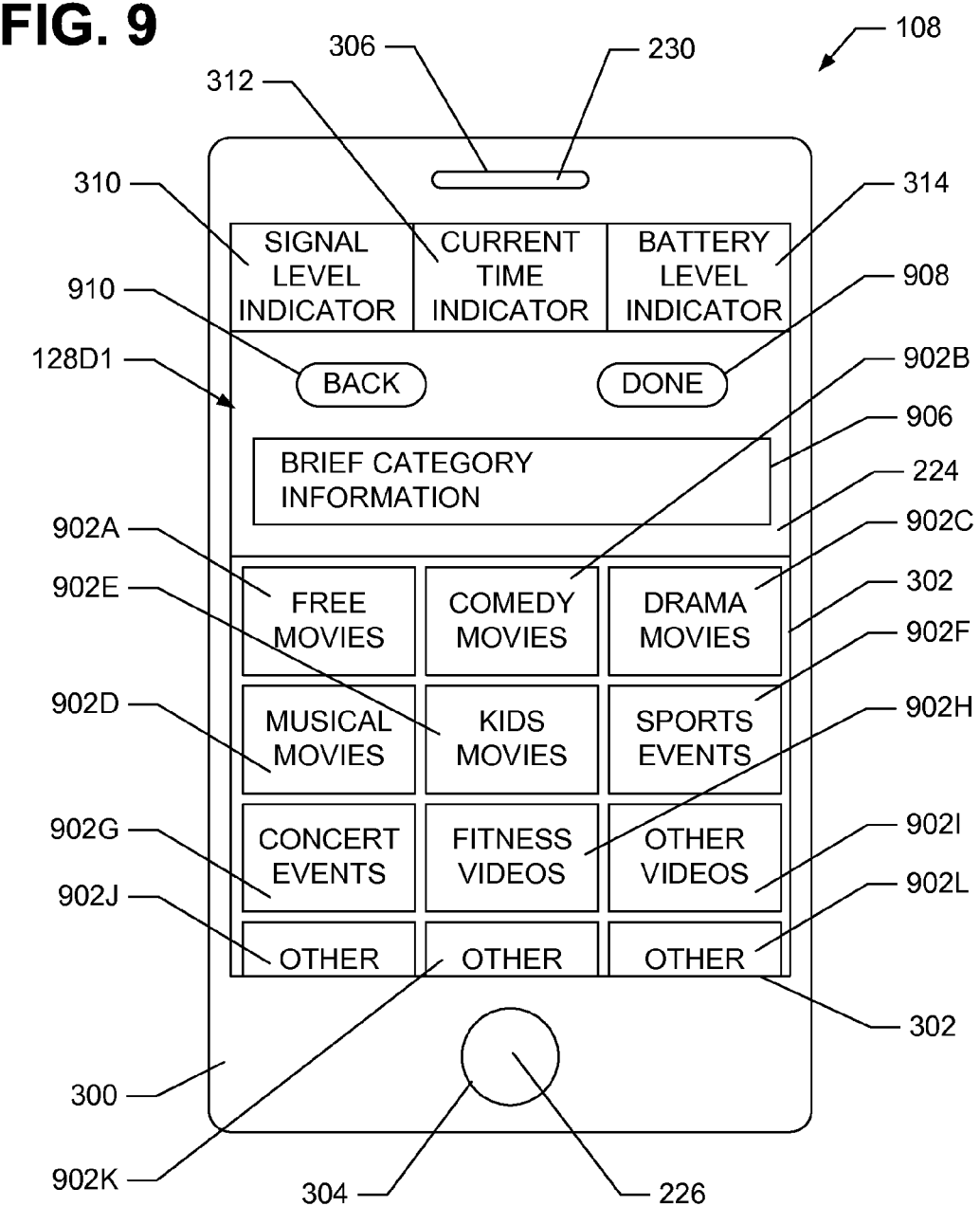
FIG. 9 displays a front, schematic view of a personal communication device and a category selection skin thereof in accordance with the example embodiment of the present invention.

FIG. 9 displays a front, schematic view of a personal communication device 108 with a first video on demand skin 218D1 displayed on the device's touch screen display 224 according to the example embodiment of the present invention. The first video on demand skin 218D1 (also sometimes referred to as a "category selection skin 218D1") is generally displayed by processing unit 200 on the touch screen display 224 in response to the processing unit 200 receiving a selection of the video on demand application 216D via the multimedia application selection skin 218B3 (i.e., selection of icon 600B) and initiating execution of the video on demand application 216D. The first video on demand skin 218D1 provides a user interface for the personal communication device 108 to present categories of videos available for viewing on the presentation device 126 connected to the set top box 118 with which personal communication device 108 is currently interacting during the communication session. The first video on demand skin 218D1 also provides a user interface for the personal communication device 108 to obtain a selection of a category of videos from which the user desires to see a list of included videos available for selection via personal communication device 108 and viewing via same presentation device 126.

The first video on demand skin 218D1 includes a video category panel 900 and a displayed plurality of icons 902 therein with each icon 902A-L corresponding in one-to-one correspondence to a category of videos from which a video may be selected for viewing via the video on demand service provided by the cable television service provider. For example, icon 902A is associated in one-to-one correspondence with the "free movies" category such that when the user selects icon 902A using a finger, stylus or other implement to depress the touch screen display 224 in the area of icon 902A, the personal communication device's processing unit 200 displays a second video on demand skin 218D2 showing a list of videos (e.g., movies) in the "free movies" category that are available for viewing. Similarly, icons 902B-902H are associated, respectively, in one-to-one correspondence with the "comedy movies", "drama movies", "musical movies", "kids movies", "sports events", "concert events", and "fitness videos". Icons 902I-902L are associated, respectively, in one-to-one correspondence with various other categories of videos available using the cable television service provider's video on demand service. Upon selection of an icon 902 by the user using a finger, stylus or other implement to depress the touch screen display 224 in the area of the selected icon 902, the personal communication device's processing unit 200 displays a second video on demand skin 218D2 to present a list of the videos within the selected category that are available for viewing. Similar to the matrix 700 of the first program guide skin 218C1, the icons 902 are arranged generally in a row and column matrix 904. A user may scroll the matrix 904 within and relative to the video category panel 900 in order to render visible and selectable icons 902 and, hence, categories of videos that may not be visible or selectable to the user at the then present time. It should be appreciated that while the icons 900 of the example embodiment have a generally rectangular shape and are arranged in a row and column matrix 904, the icons 900 may have any shape and may be arranged in any manner in other embodiments. It should also be appreciated that other embodiments may not employ icons 904 or similar elements to display or identify the categories of videos that are available for selection by a user.

The first video on demand skin 218D1 also includes a brief category information panel 906, a "done" button 908, and a "back" button 910 that are available for selection by a user. The processing unit 200 displays, in brief category information panel 906, information about a category of videos highlighted and selected from the matrix 904 by a user tapping on the touch screen display 224 with a finger, stylus or other implement in the area of an icon 902 displaying the name of the category of interest to the user. Such information may include, without limitation, the category's name and the types of videos included in the categories. For example, if the "fitness videos" icon 902H is selected by a user, the brief category information panel 906 might display information pertaining to the category such as "Includes fitness videos suitable for men and women providing workouts accompanied by music".

The user generally selects the "done" button 908 after the user has selected a category of videos by depressing the touch screen display 224 in the area of the desired category using a finger, stylus or other implement. Selection of the "done" button 908 signals the processing unit 200 to display the second video on demand skin 218D2 described below. Selection of the "back" button 910 signals the processing unit 200 to terminate the video on demand application 216D and to again display the multimedia application selection skin 218B3 on the touch screen display 224, thereby enabling the user to select a different application 216 for execution and use.

Figure 10:
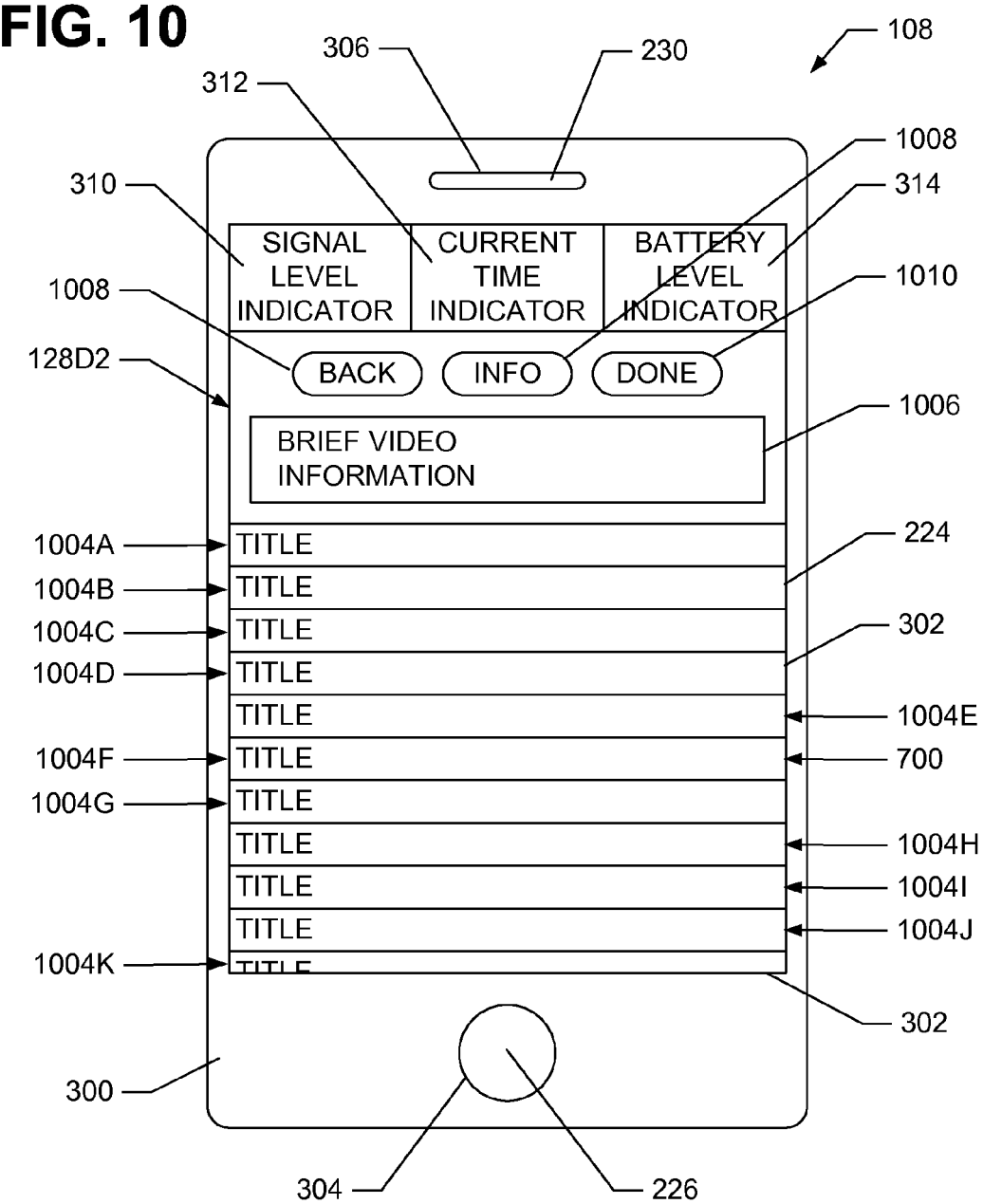
FIG. 10 displays a front, schematic view of a personal communication device and a video selection skin thereof in accordance with the example embodiment of the present invention.

FIG. 10 displays a front, schematic view of a personal communication device 108 with a second video on demand skin 218D2 displayed on the device's touch screen display 224 according to the example embodiment of the present invention. The second video on demand skin 218D2 (also sometimes referred to as a "video selection skin 218D2") is generally displayed by processing unit 200 on the touch screen display 224 when the processing unit 200 receives a selection of the "done" button 908 on the first video on demand skin 218D1. The second video on demand skin 218D2 provides a user interface for the personal communication device 108 to display the titles of videos available for viewing from the category of videos selected via the first video on demand skin 218D1 and to obtain a selection of a video for viewing on a presentation device 126 connected to the set top box 118 with which personal communication device 108 is currently interacting with during the communication session.

The second video on demand skin 218D2 includes a video selection panel 1000 that displays the information identifying and associated with each video belonging to the category of videos selected by the user via the first video on demand skin 218D1. According to the example embodiment, the video selection panel 1000 has a list control 1002 having a plurality of rows 1004 with each row 1004 corresponding in one-to-one correspondence with a video such that each row 1004 includes a title for a different video available for selection by the user. In other embodiments, each video may be represented in an alternative manner within the video selection panel 1000.

The second video on demand skin 218D2 also includes a brief video information panel 1006. The processing unit 200 displays, in brief video information panel 1006, information about a video highlighted and selected from the list control 1002 by a user tapping on the touch screen display 224 with a finger, stylus or other implement in the area of a row 1004 displaying the title of a video of interest to the user. Such information may include, without limitation, the title of the video, the video's parental rating, the year the video was made, the starting and ending times for the video, and the cost, if any, associated with viewing of the video. The information may, of course, include other information as well.

Additionally, the second video on demand skin 218D2 includes an "info" button 1008, a "done" button 1010, and a "back" button 1012. Selection of each of these buttons 1008, 1010, 1012 is made by a user tapping the touch screen display 224 in the area around the respective button 1008, 1010, 1012 with a finger, stylus or other implement. In response to the "info" button 1008 being selected, the processing unit 200 displays a third video on demand skin 218D3 that presents detailed information about an identified or selected video to a user. The third video on demand skin 218D3 is described in more detail below. Selection of the "done" button 1010 signals the processing unit 200 to communicate a message to the frontend server computer 102 via communication links 110, 114 and communication network 112, including information uniquely identifying the set top box 118 being interacted with via the personal communication device 108 during the communication session and information identifying the video selected by the user. Upon receiving such message, the frontend server computer 102 communicates, or forwards, the message to the backend server computer 104 via communication link 106, to cause the backend server computer 104 to playback or stream the selected video to the identified set top box 118. After receiving the message from the frontend server computer 102, the backend server computer 104 begins playing back, or streaming, the video to the identified set top box 118 (and, hence, to its connected presentation device 126) via television network 116 and communication links 120, 124. If there is charge associated with viewing of the selected video, the backend server computer 104 also performs various billing related tasks to charge viewing of the video to the user's financial account with the cable television service provider. Meanwhile, the processing unit 200 displays a fourth video on demand skin 218D4 (described in more detail below) that enables a user to control viewing of the selected video via the personal communication device 108. Selection of the "back" button 1012 signals the processing unit 200 to again display the first video on demand skin 218D1 on the touch screen display 224.

Figure 11:
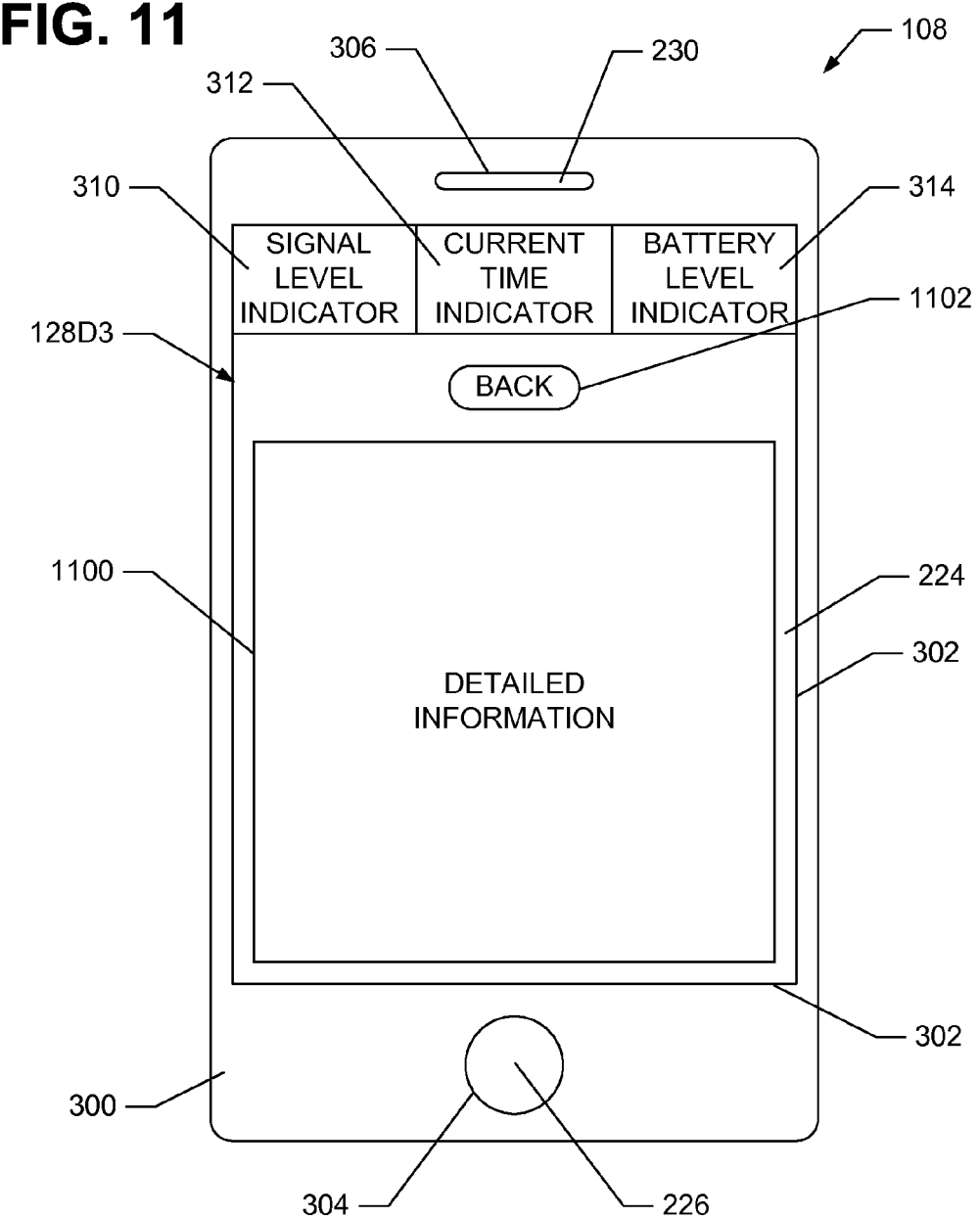
FIG. 11 displays a front, schematic view of a personal communication device and a video information skin thereof in accordance with the example embodiment of the present invention.

FIG. 11 displays a front, schematic view of a personal communication device 108, in accordance with the example embodiment of the present invention, with a third video on demand skin 218D3 displayed on the device's touch screen display 224. The third video on demand skin 218D3 (also sometimes referred to as a "video information skin 218D3") is typically displayed by processing unit 200 on the touch screen display 224 in response to the processing unit 200 receiving a selection of the "info" button 1008 on the second video on demand skin 218D2. The third video on demand skin 218D3 provides a user interface for the personal communication device 108 to display detailed information about or pertaining to a video selected or identified by a user via the second video on demand skin 218D2 as described above.

The third video on demand skin 218D3 includes a detailed information panel 1100 and a "back" button 1102. The processing unit 200 displays, in detailed information panel 1100, detailed information about a video selected or identified by a user via the second video on demand skin 218D2. The detailed information may include different information depending on the video's type. For example and not limitation, if the video is a movie, the detailed information may include the names of the actors appearing in the movie, descriptions of the movie's plot and characters, the names of the producers and directors, information identifying the locations on which the movie was filmed, and other information. If the video is a pay per view boxing match, the detailed information may include data describing physical characteristics of the participants such as their height, weight, and reach, the participants won/lost records, the names of the participants' home towns, the names of the trainers for each of the participants, and other information. For other video types, the detailed information may vary. Additionally, as a convenience to the user, the detailed information panel 1100 may display some or all of the information that was displayed in the brief program information panel 1006 of the second video on demand skin 218D2. If all of the detailed information is not visible in the detailed information panel 1100, a user may scroll through the detailed information by depressing the touch screen panel 224 in the area of the detailed information panel 1100 with a finger, stylus or other implement and moving the same up or down depending on the desired scrolling direction. In response, the processing unit 200 will scroll the detailed information up or down, as the case may be, within the detailed information panel 1100.

The "back" button 1102 of the third video on demand skin 218D3 enables a user of a personal communication device 108 to return to the second video on demand skin 218D2. Selection of the "back" button 1102 by a user depressing the touch screen display 224 in the area of the "back" button 1102 with a finger, stylus or other implement, signals the processing unit 200 to re-display the second video on demand skin 218D2 on the touch screen display 224.

Figure 12:
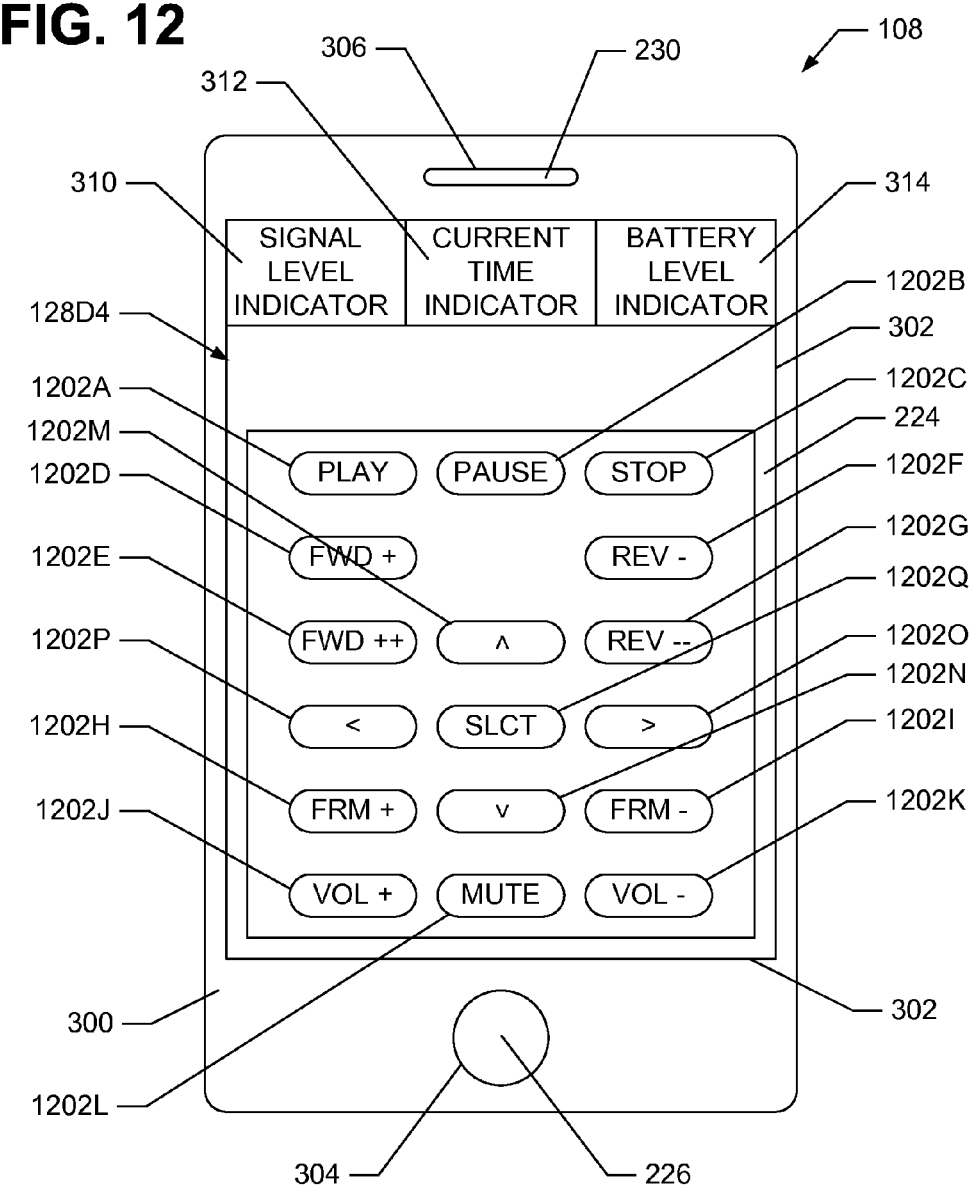
FIG. 12 displays a front, schematic view of a personal communication device and a video control skin thereof in accordance with the example embodiment of the present invention.

FIG. 12 displays a front, schematic view of a personal communication device 108, according to the example embodiment of the present invention, with a fourth video on demand skin 218D4 displayed on the device's touch screen display 224. The fourth video on demand skin 218D4 (also sometimes referred to as a "video control skin 218D4") is generally displayed by processing unit 200 on the touch screen display 224 in response to the processing unit 200 receiving a selection of the "done" button 1010 on the second video on demand skin 218D2. The fourth video on demand skin 218D4 provides a user interface for the personal communication device 108 to receive inputs from the user that control the playback, or streaming, of a video selected by the user via the second video on demand skin 218D2. As an alternative to using the fourth video on demand skin 218D4 to control the playback, or streaming, of a video, the user may use a conventional remote control provided by the cable television service provider for interaction with a set top box 118 to provide similar functionality.

The fourth video on demand skin 218D4 includes a button panel 1200 having a plurality of buttons 1202 present therein. Each button 1202 enables a user to control a particular aspect of the viewing of a selected video and/or provide inputs to the backend server computer 104 via communication network 112, frontend server computer 102, and communication links 106, 110, 114. Each button 1202 is selected by a user tapping the touch screen display 224 in an area of the respective button 1202 using a finger, stylus or other implement. The plurality of buttons 1202, according to the example embodiment, are arranged in multiple rows and columns, but may be arranged in any manner or other arrangement in other embodiments.

The plurality of buttons 1202 comprises a "play" button 1202A, a "pause" button 1202B, and a "stop" button 1202C. Selection of the "play" button 1202A causes the processing unit 200 to communicate a message to the backend server computer 102 requesting that playback, or streaming, of the selected video be performed at normal playback speed. Upon receiving the message requesting playback, the backend server computer 104 initiates playback, or streaming, of the selected video to the set top box 118 with which the user is interacting during the communication session and, hence, to the connected presentation device 126 via television network 116 and communication links 120, 124, 128. Playback is initiated either at the beginning of the selected video if the message comprises an initial playback request or at the frame of the video where playback was previously paused. Selection of the "pause" button 1202B causes the processing unit 200 to communicate a message to the backend server computer 102 requesting that playback, or streaming, of the selected video be temporarily suspended pending further input from the user. Selection of the "stop" button 1202C causes the processing unit 200 to (i) communicate a message to the backend server computer 102 requesting that playback, or streaming, of the selected video be stopped, and (ii) again display the first video on demand skin 218D1 on the touch screen display 224 of the personal communication device 108.

The plurality of buttons 1202 also comprises a fast forward button 1202D, a super fast forward button 1202E, a fast reverse button 1202F, a super fast reverse button 1202G, a frame advance button 1202H, and a frame reverse button 1202I. When one of buttons 1202D-1202I is selected by a user from the fourth video on demand skin 218D4, the processing unit 200 sends a message to the backend server computer 104 requesting that the backend server computer 104, respectively: continue playback, or streaming, of the selected video in the forward direction at fast speed; continue playback, or streaming, of the selected video in the forward direction at super fast speed; continue playback, or streaming, of the selected video in the reverse direction at fast speed; continue playback, or streaming, of the selected video in the reverse direction at super fast speed; playback, or stream, one frame of the selected video in the forward direction; and playback, or stream, one frame of the selected video in the reverse direction. The backend server computer 104 responds to the message by accordingly modifying the playback, or streaming, speed and/or direction of the selected video to the set top box 118 with which the personal communication device 108 is interacting during the communication session.

Additionally, the plurality of buttons 1202 comprises a "volume up" button 1202J, a "volume down" button 1202K, and a "mute" button 1202L. Upon receiving a selection of the "volume up" button 1202J, the "volume down" button 1202K, or the "mute" button 1202L, the processing unit 200 communicates a message to the backend server computer 104 requesting that the audio level associated with playback, or streaming, of the selected video be increased, reduced, or muted, as the case may be. The backend server computer 104 then communicates an appropriate message/command, via television network 116 and communication links 120, 124, to the set top box 118 with which the personal communication device 108 is interacting during the communication session. The set top box 118 interprets the message/command and takes action appropriate for the message/command to increase, decrease, or mute the volume of the audio portion of the selected video being communicated to a connected presentation device 126.

In addition, the plurality of buttons 1202 comprises an "up arrow" button 1202M, a "down arrow" button 1202N, a "right arrow" button 1202O, a "left arrow" button 1202P, and a "select" button 1202Q. Buttons 1202M-Q are used by a user to navigate through any screens (e.g., by moving an on-screen cursor or selecting an on-screen option or item) that the backend server computer 104 may cause to be displayed, as part of the cable television service provider's video on demand service, on a presentation device 126 connected to a set top box 118 with which the personal communication device 108 is then interacting during the communication session. Upon receiving a selection of a button 1202M-Q, the processing unit 200 generates and communicates a message to the backend server computer 104. The message includes appropriate data to cause the backend server computer 104 to move an on-screen cursor in the direction indicated by the arrow buttons 1202M-P or to select an on-screen option or item. The backend server computer 104 then moves the on-screen cursor accordingly or takes action according to the user's selection of an on-screen option or item of the video on demand service.

It should be appreciated that, in accordance with the example embodiment, the messages described above with regard to FIG. 12, each include information uniquely identifying the set top box 118 with which the personal communication device 108 is currently interacting during a communication session with the system 100. Such information may include, but not be limited to, the media access control (MAC) number, or address, associated with such set top box 118. It should also be appreciated that, according to the example embodiment, the messages are communicated from the personal communication device 108 to the backend server computer 104 via the frontend server computer 102 (which takes no action on such received messages and forwards received messages to the backend server computer 104) and communication links 106, 110, 114. In other embodiments, the frontend server computer 102 may take action on the received messages, including, but not limited to, reformatting the received messages to a form usable by the backend server computer 104 or generating new messages for communication to the backend server computer 104 corresponding to the received messages.

Figure 13:
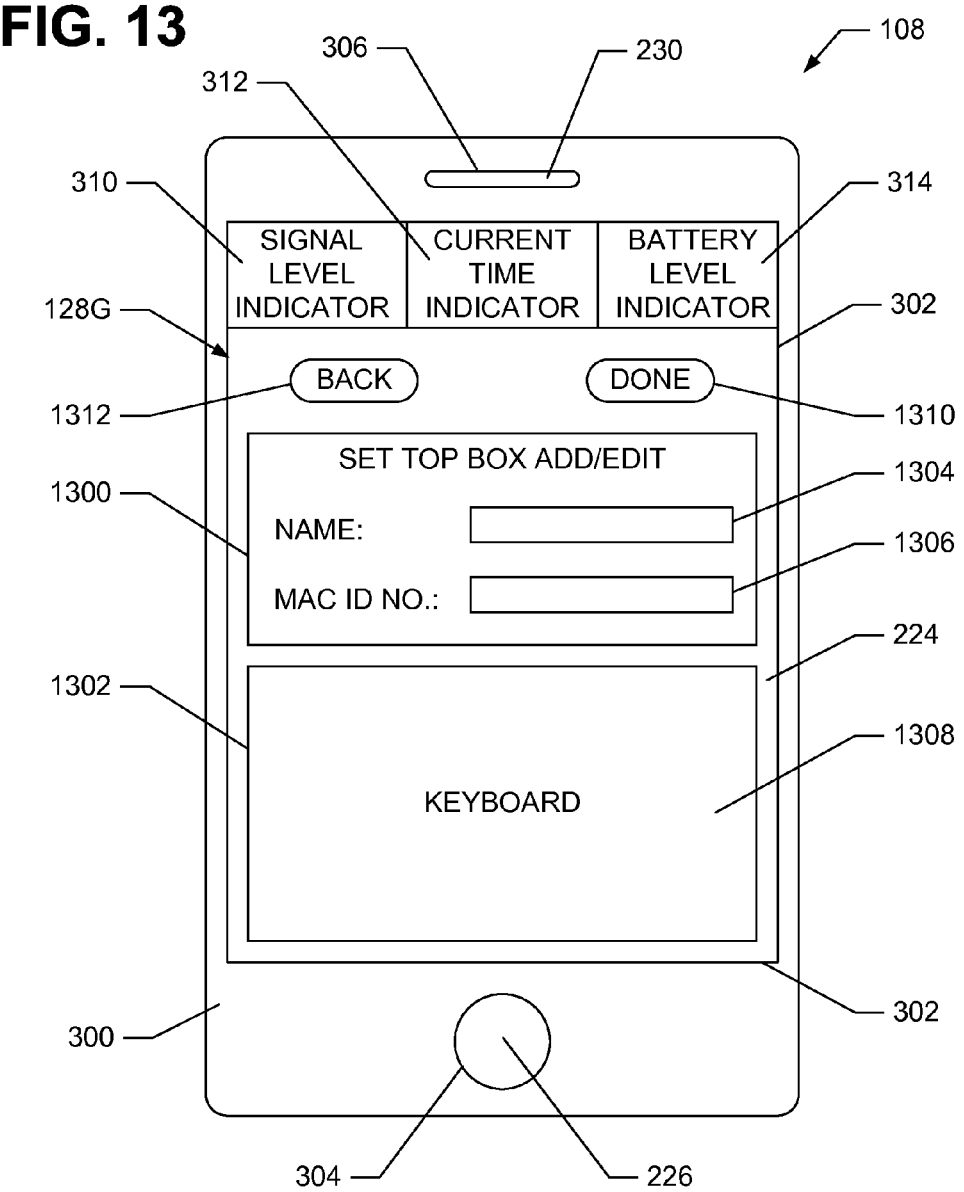
FIG. 13 displays a front, schematic view of a personal communication device and a set top box add/edit skin thereof in accordance with the example embodiment of the present invention.

FIG. 13 displays a front, schematic view of a personal communication device 108 with a set top box add/edit skin 218G displayed on the device's touch screen display 224 in accordance with the example embodiment of the present invention. The set top box add/edit skin 218G is displayed by processing unit 200 on the touch screen display 224 when the processing unit 200 begins execution of the set top box add/edit application 216G in response to (i) the processing unit 200 receiving a selection of the set top box add/edit application 216G via the multimedia application selection skin 218B3 (i.e., selection of icon 600E) or (ii) the personal communication device 108 being used for the first time with no set top box related information having been previously provided to the personal communication device 108. The set top box add/edit skin 218G provides a user interface for the personal communication device 108 to obtain set top box related information input by the user when the user desires to use and/or configure a set top box 118 for which information has not already been made available to the personal communication device 108 and/or system 100. The user interface also enables the personal communication device 108 to obtain edits input by the user to set top box related information that was previously provided to the personal communication device 108 and/or system 100.

The set top box add/edit skin 218G includes a set top box identification panel 1300 and a keyboard panel 1302. The set top box identification panel 1300 has a set top box name input control/box 1304 and media access control (MAC) number control/box 1306 for respectively receiving a set top box name (i.e., for use and display by set top box selection skin 218B2 described above with respect to FIG. 5) and the media access control (MAC) number, or address, uniquely identifying the set top box 118 being configured in the personal communication device 108 and/or system 100. According to the example embodiment, the keyboard panel 1302 has a keyboard 1308 having a plurality of keys (although shown schematically as a rectangle in FIG. 13 without individual keys being illustrated) arranged in a QWERTY style key format with each alphabetic character and number being associated with a respective key. By selecting the set top box name or media access control (MAC) number control/box 1304, 1306 and then selecting the appropriate keys from the keyboard 1308 in an order appropriate for the set top box name or media access control (MAC) number, as the case may be, a user inputs the set top box name and media access control (MAC) number.

In addition to the set top box identification and keyboard panels 1300, 1302, the set top box add/edit skin 218G includes a "done" button 1310 and a "back" button 1312 that may be selected by a user. The "done" button 1310 is typically selected by the user once the user has input a set top box name and media access control (MAC) number into the respective set top box name control/box 1304 and media access control (MAC) number control box 1306. Selection of the "done" button 1310 signals the processing unit 200 to store the received set top box name and corresponding, unique media access control (MAC) number, or address, in non-volatile memory 208 as non-volatile application data 222 for future use by the personal communication device 108. Selection of the "back" button 1312 signals the processing unit 200 to end execution of the set top box add/edit application 216G, to begin execution of the system access application 216B at the point where the user may select a multimedia application 216C-H, and to again display the third system access skin 218B3 displaying multimedia applications 216C-H that may be selected by the user for execution by processing unit 200.

Figure 14:
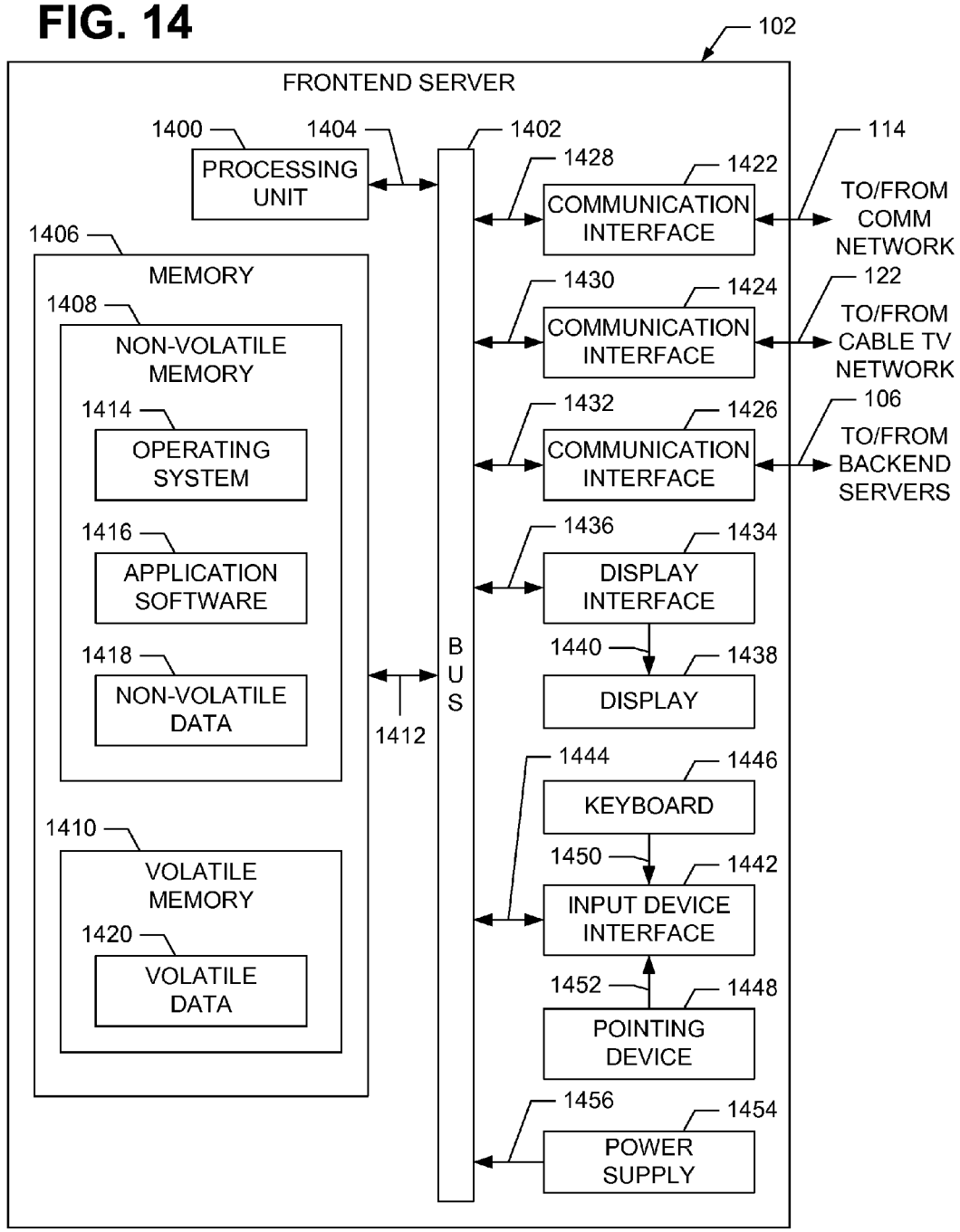
FIG. 14 displays a block diagram representation of a frontend server computer in accordance with the example embodiment of the present invention.

FIG. 14 displays a block diagram representation of a frontend server computer 102 in accordance with the example embodiment of the present invention. The frontend server computer 102 is configured and adapted to: receive messages and/or data from personal communication devices 108 via communication network 112; handle messages and/or data related to authentication of users for access to the system 100, configuration of personal communication devices 108 and set top boxes 118 within the system 100, program guide services, and digital video recorder (DVR) services; and, forward or communicate messages and/or data to the backend server computer 104 if the messages and/or data relate to services that are primarily provided by the backend server computer 104 such as, for example and not limitation, video on demand services, audio on demand services, and account management services.

The frontend server computer 102 comprises one or more processing units 1400 that are adapted to execute computer software instructions of an operating system 1414 and application software 1416 described in more detail below, and other computer software as required to provide the functionality described herein. The processing unit(s) 1400 may include, but not be limited to, microprocessors or other similar components. Each processing unit(s) 1400 is connected to a bus 1402 by bi-directional communication paths 1404 for the bi-directional communication of address, data and control signals with the bus 1402. The bus 1402 includes a plurality of address, data and control electrical signal paths as appropriate to communicate address, data and control electrical signals between the various components of the frontend server computer 102.

The frontend server computer 102 further comprises a memory 1406, including non-volatile memory 1408 and volatile memory 1410. The memory 1406 is communicatively connected to bus 1402 for the bi-directional communication of computer software instructions, addresses, data and control signals with the bus 1402 and other components connected to the bus 1402, through one or more bi-directional communication paths 1412. Non-volatile memory 1408 generally stores information and/or data that will not be lost when electrical power to the non-volatile memory 1408 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 1410 typically stores information and/or data for a temporary period of time, as such information and/or data that will be lost when electrical power is no longer supplied to the volatile memory 1410. Examples of volatile memory include, but are not limited to, non-battery backed up random access memory devices.

According to the example embodiment, non-volatile memory 1408 stores a plurality of computer software instructions of an operating system 1414 that, when delivered to and executed by processing unit 1400, enable the processing unit 1400 and other frontend server computer 102 components to perform various actions and provide the basic functionality necessary to implement the methods described herein. Non-volatile memory 1408 also stores pluralities of computer software instructions of application software 1416 that, when executed by a processing unit 1400, enable and cause the frontend server computer 102 to perform functions associated with the application software 1416 and described herein such as user authentication, personal communication device 108 and set top box 118 configuration (including, but not limited to, downloading and maintenance of data for program guide and digital video recorder (DVR) services), program guide services, digital video recorder (DVR) services, and forwarding of messages to/from the backend server computer 104 as appropriate. Non-volatile memory 1408 additionally stores non-volatile application data 1418 that is used by the application software 1416. Such non-volatile application data 1418 may include, but not be limited to: user authentication information including user names and passwords for use in accessing, or controlling access to, the system 100; program guide data corresponding to television programs available for viewing at various times and on various channels; video on demand data identifying categories of non-television program video and non-television program video available for viewing upon selection by the user; digital video recorder (DVR) data corresponding to video that has been recorded already (and is available for viewing) or that is scheduled for recording by a user's set top box 118; audio on demand data identifying audio available for listening to at various times and on various channels, on demand upon selection by the user; set top box configuration data (including, without limitation, information uniquely identifying a user's set top boxes 118 typically comprising their respective media access control (MAC) number); account management data including, perhaps, a user's account number and/or personal identification number (PIN) used to access the user's financial account with the cable television service provider and/or charge, to such account, the cost of video on demand or audio on demand services provided to a user; and other data required to provide the functionality described herein.

Volatile memory 1410 stores volatile application data 1420 that is created and/or used by the application software 1416 during execution. Volatile application data 1422 may include, for example, messages received from personal communication devices 108, messages to be sent to personal communication devices 108, messages received from backend server computer 104, and messages to be sent to backend server computer 104, intermediate data, and other information or data.

The frontend server computer 102 also comprises communication interfaces 1422, 1424, 1426 that connect to bus 1402 via respective communication paths 1428, 1430, 1432 for the bi-directional communication of address, data and control signals therebetween. According to the example embodiment, communication interfaces 1422, 1424, 1426 respectively include: one or more communication interface(s) adapted, configured and operational to bi-directionally communicate messages, information and/or data with communication network 112 via communication links 114; one or more communication interface(s) adapted, configured and operational to bi-directionally communicate messages, information and/or data with television network 116 via communication links 122; and one or more communication interface (s) adapted, configured and operational to bi-directionally communicate messages, information and/or data with backend server computer 104 via communication links 106.

In accordance with example embodiment, the frontend server computer 102 additionally comprises a display interface 1434 connected to bus 1402 via communication path 1436 for the bi-directional communication of addresses, data and/or control signals with the bus 1402 and various components connected to the bus 1402. A display 1438 is connected to the display interface 1434 via communication path 1440 for the receipt and display of video information and/or data received from the display interface 1434. Similarly, an input device interface 1442 is connected to bus 1402 via communication path 1444 for the bi-directional communication of addresses, data and/or control signals with the bus 1402 and various components connected to the bus 1402. A keyboard 1446 and pointing device 1448 are, respectively, connected to the input device interface 1442 via communication paths 1450, 1452 for the receipt of input from a user of the frontend server computer 102 and for the communication of data representative of such input to the input device interface 1442. A power supply 1454 is connected to bus 1402 via electrical signal path 1456 to supply electrical energy to the bus 1402 and components connected to the bus 1402 that is necessary for their operation.

Figure 15:
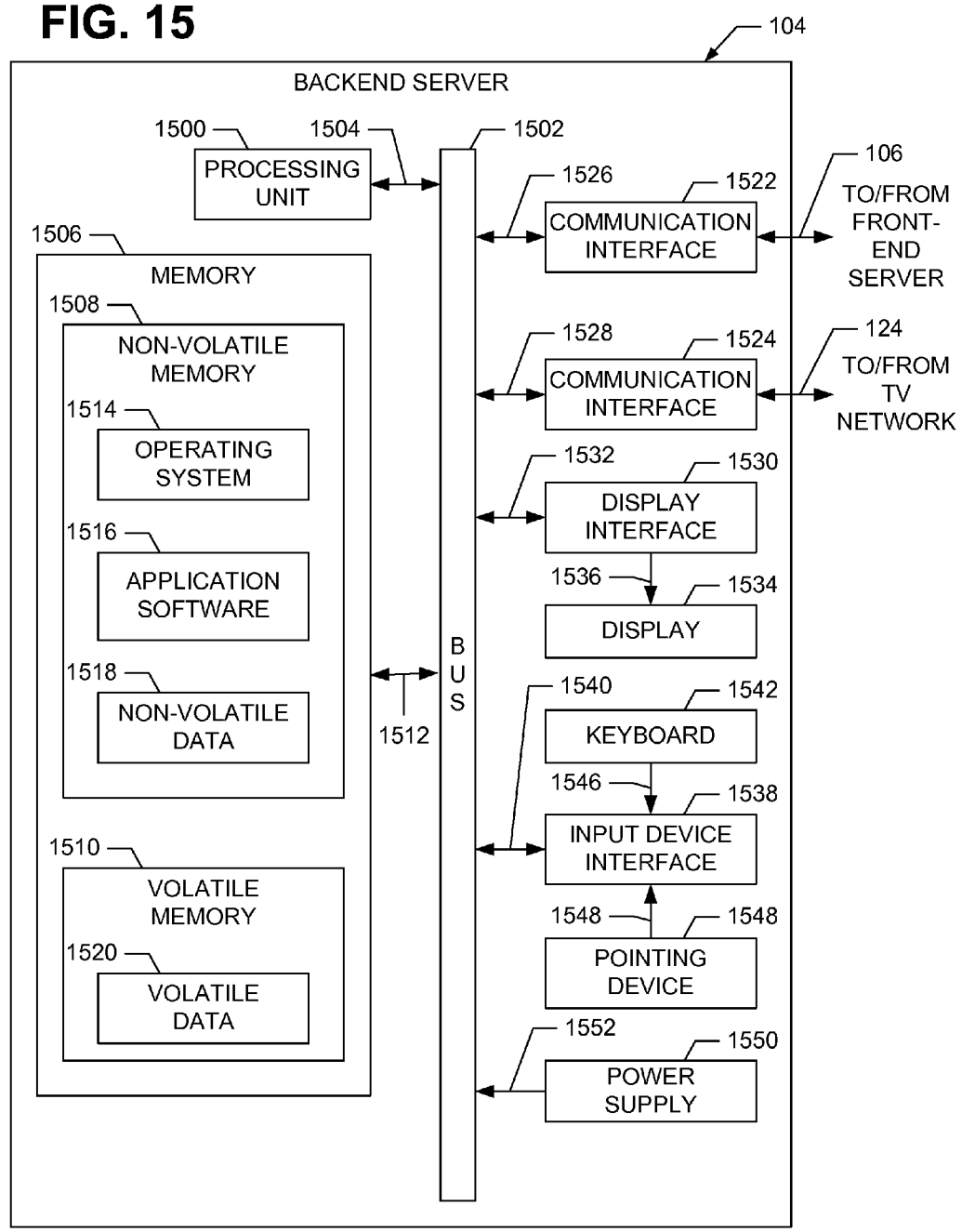
FIG. 15 displays a block diagram representation of a back-end server computer in accordance with the example embodiment of the present invention.
Figure 16A:
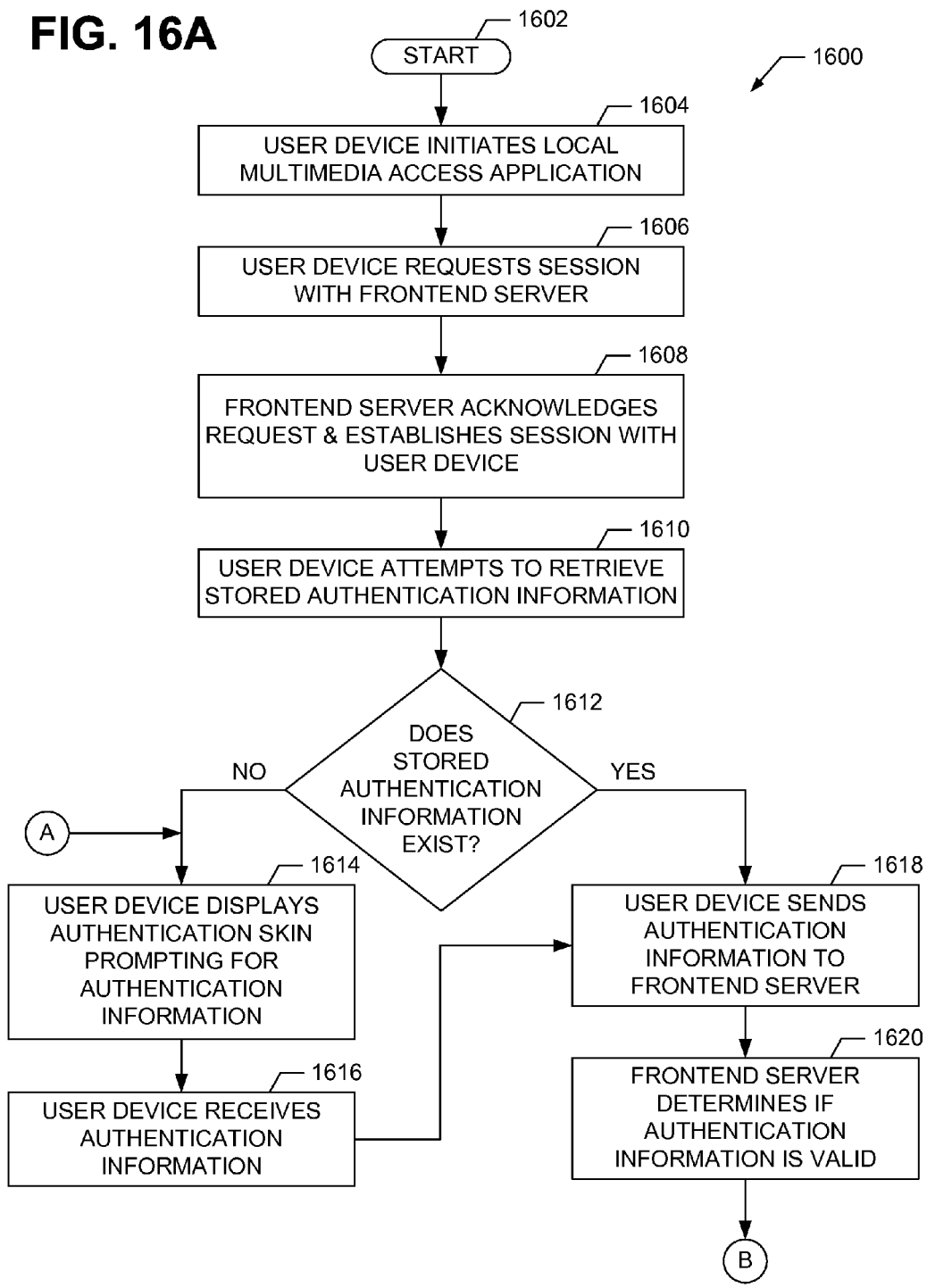
Figure 16B:
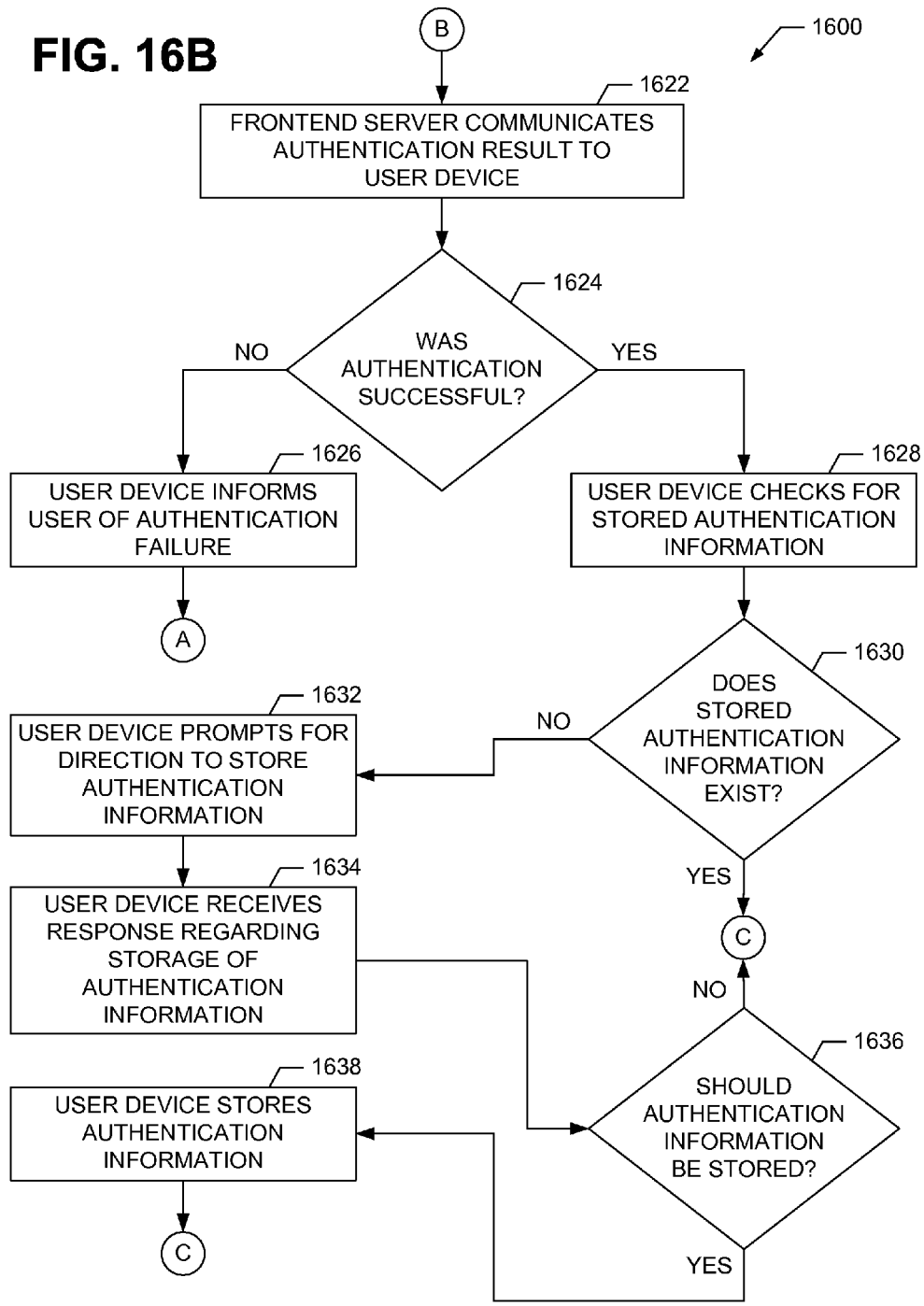
Figure 16D:
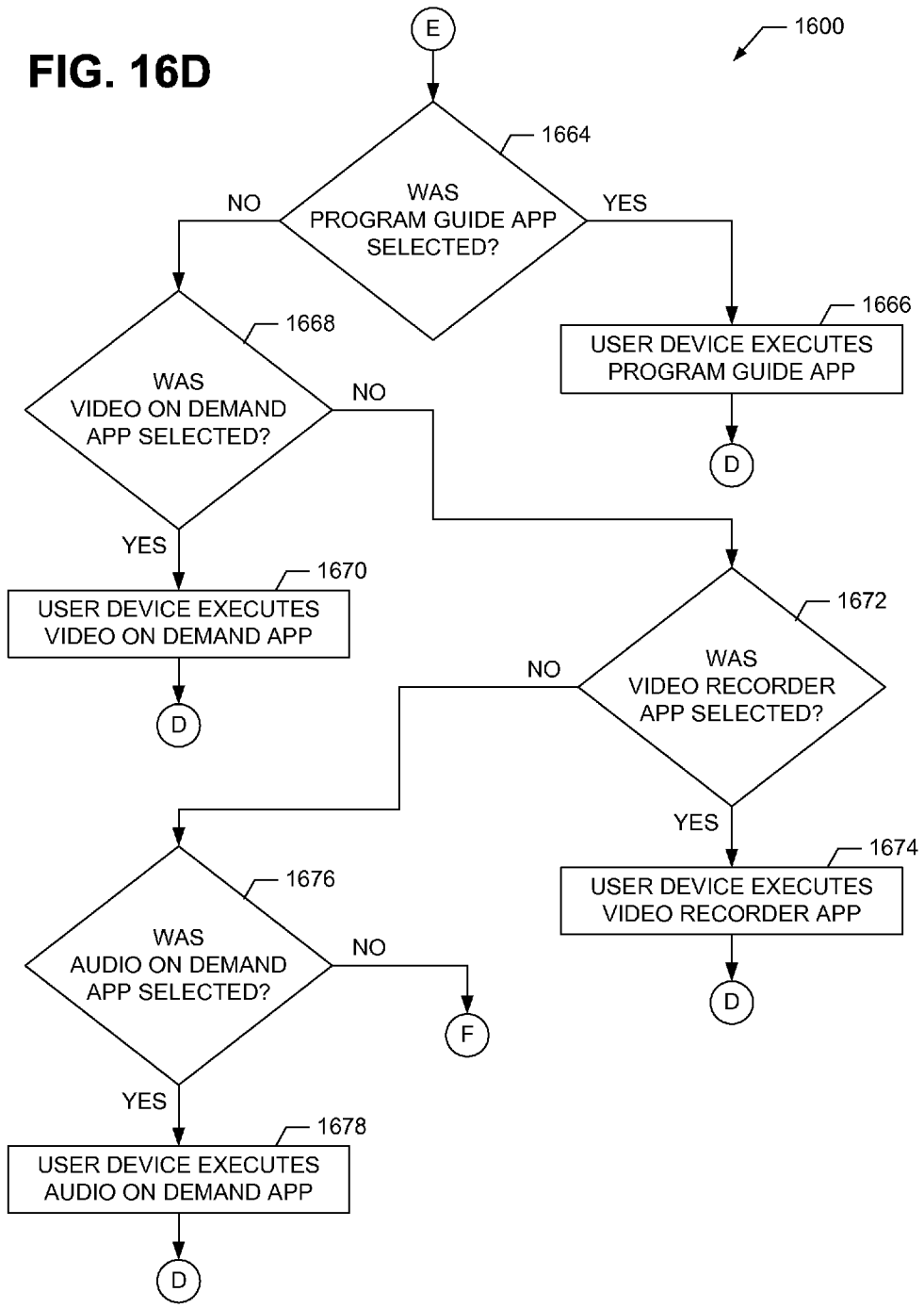
Figure 17A:
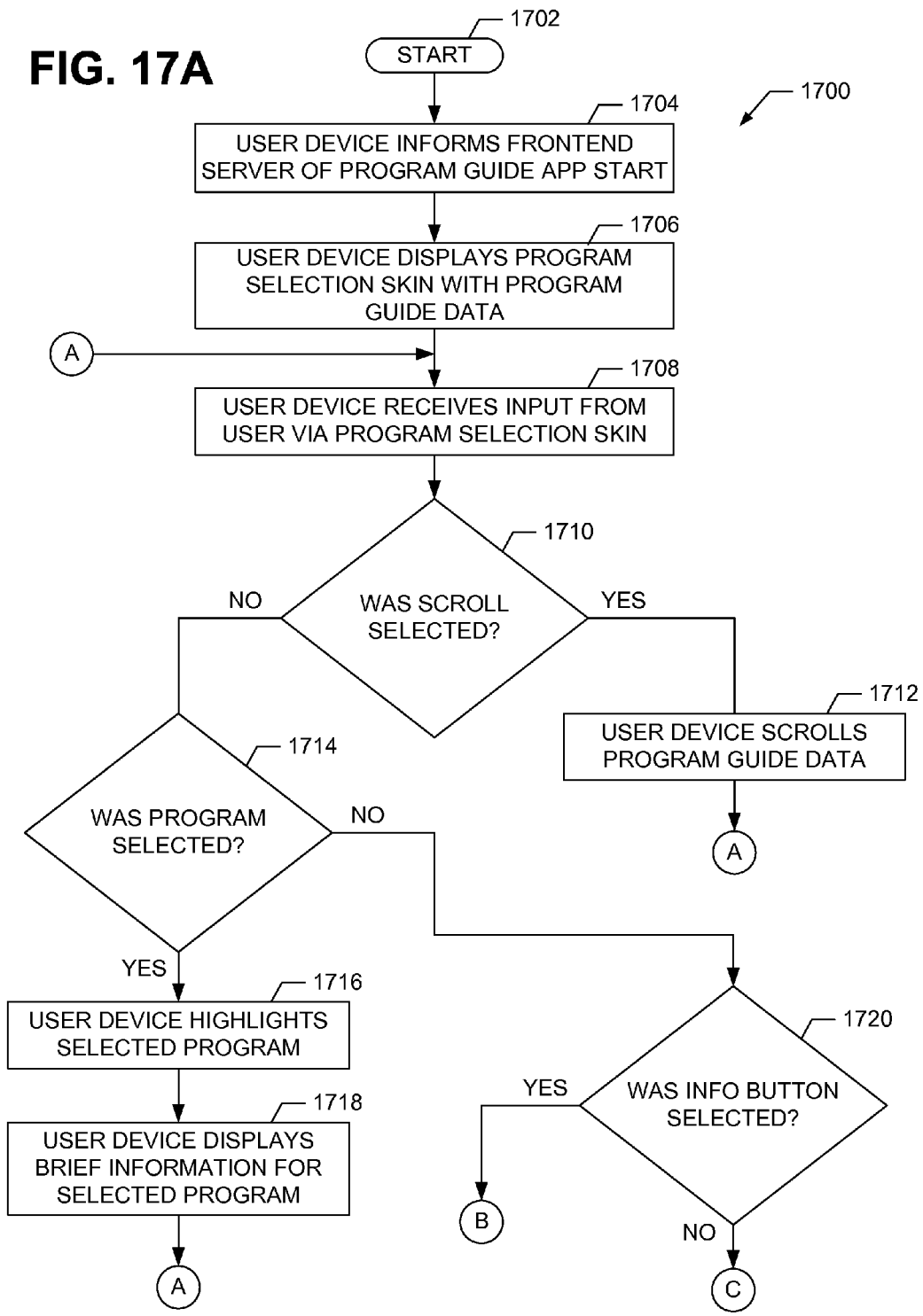
FIGS. 17A-D display a flowchart representation of a program guide method in accordance with the example embodiment of the present invention.
Figure 17B:
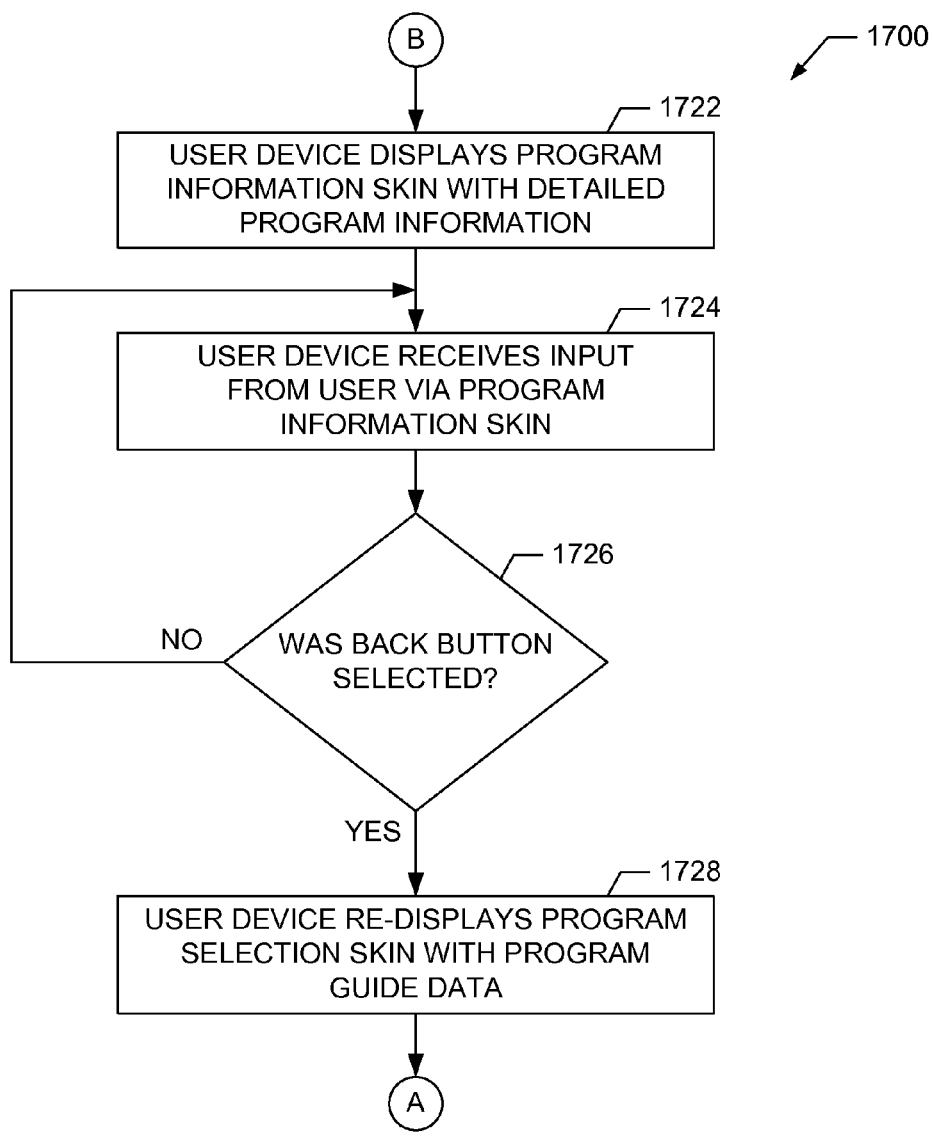
Figure 17C:
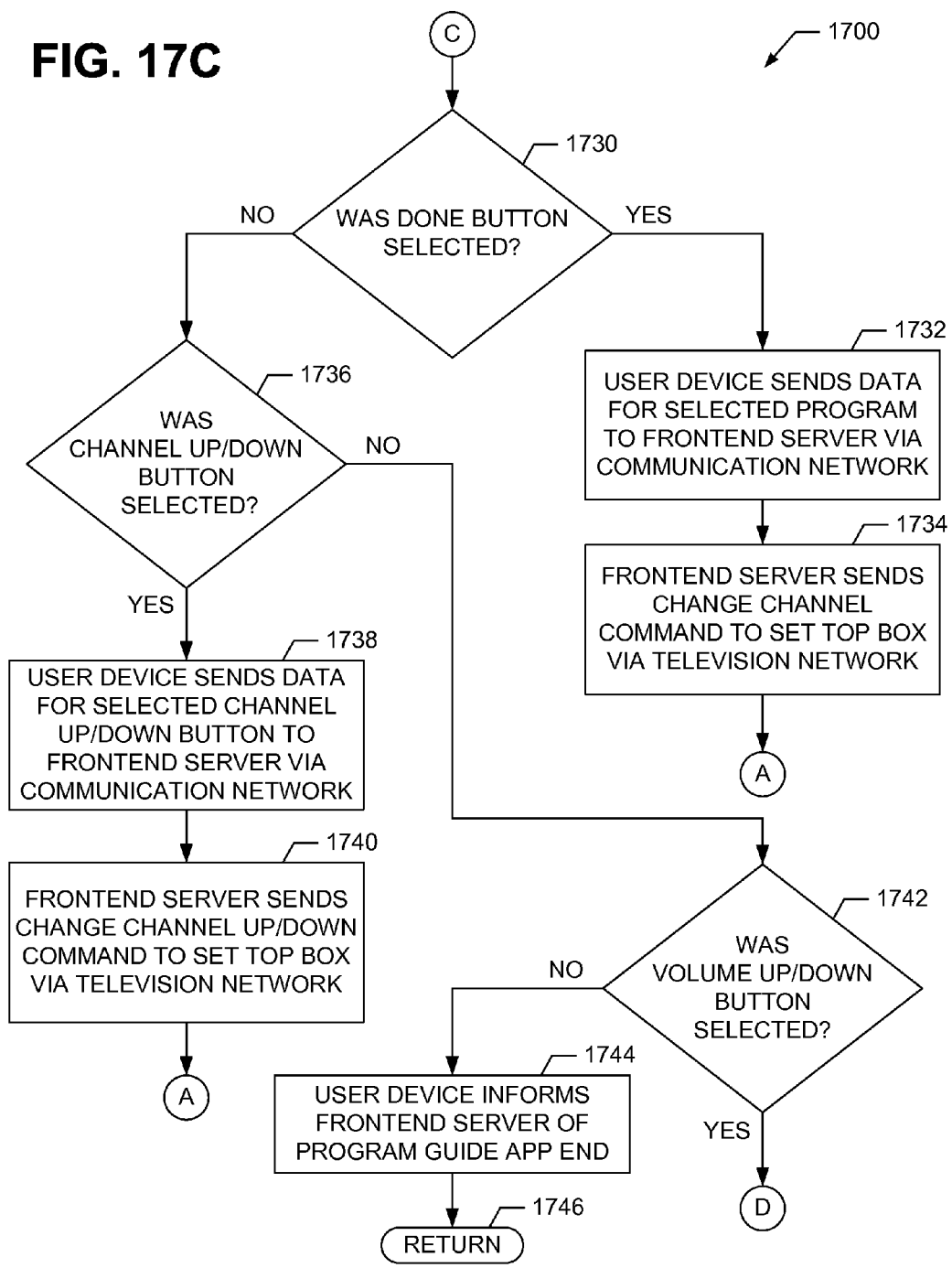
Figure 17D:
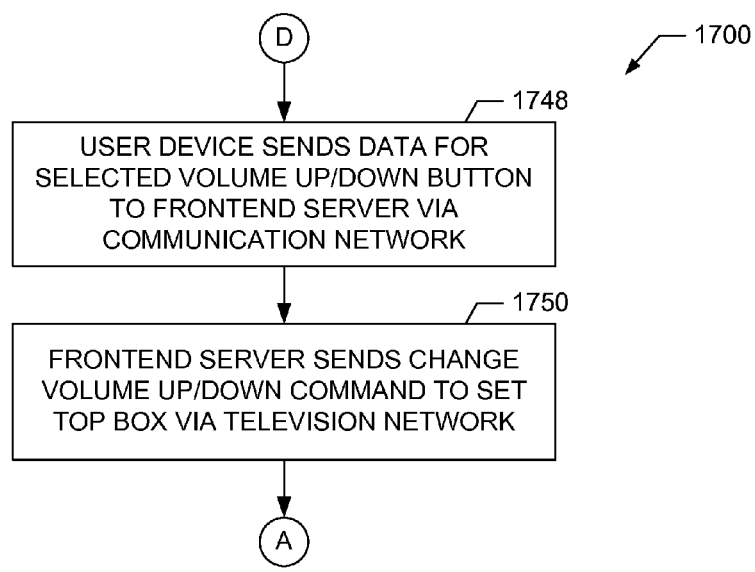
Figure 18A:
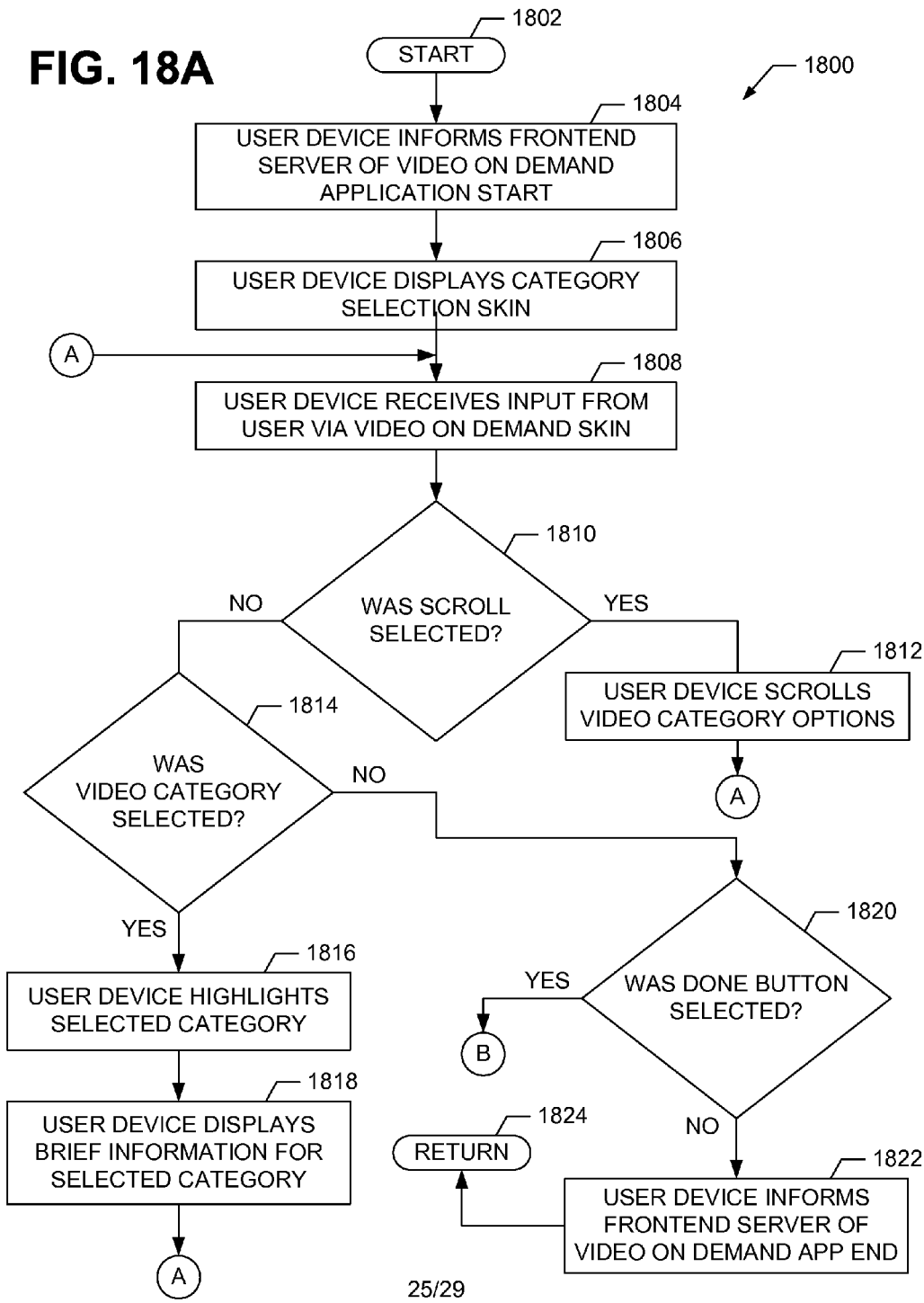
Figure 18C:
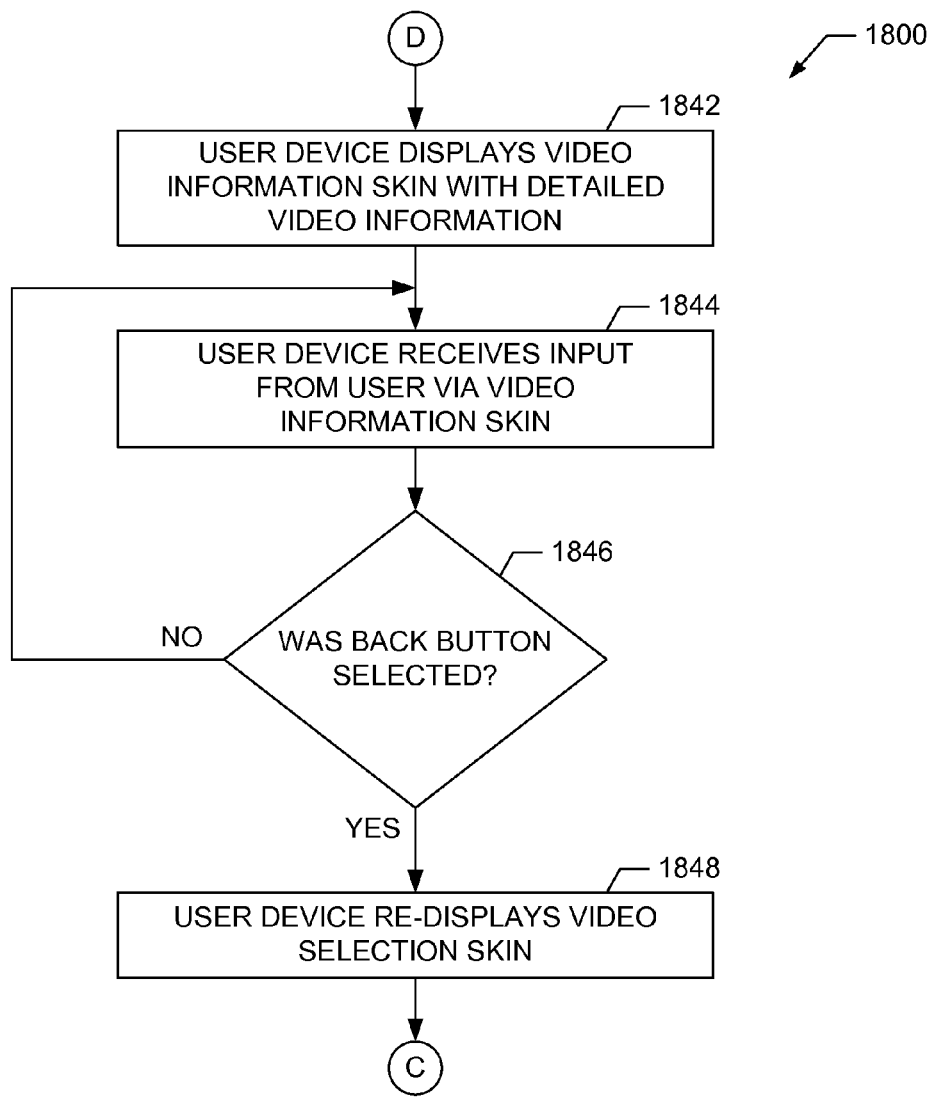

FIG. 15 displays a block diagram representation of a backend server computer 104 in accordance with the example embodiment of the present invention. The backend server computer 104 is configured and adapted to: provide video on demand, audio on demand, user account management, and other services; communicate video and audio signals associated with, and representative of, video or audio selections made by a user for presentation, such video and audio signals being communicated to appropriate set top boxes 118 via television network 116; and, receive messages and/or data from the frontend server computer 102 and generate/send messages and/or data to the frontend server computer 102 via communication link 106 in connection with video on demand, audio on demand, and user account management services.

The frontend server computer 104 comprises one or more processing units 1500 that are adapted to execute computer software instructions of an operating system 1514 and application software 1516 described in more detail below, and other computer software as required to provide the functionality described herein. The processing unit(s) 1500 may include, but not be limited to, microprocessors or other similar components. Each processing unit(s) 1500 is connected to a bus 1502 by bi-directional communication paths 1504 for the bi-directional communication of address, data and control signals with the bus 1502. The bus 1502 includes a plurality of address, data and control electrical signal paths as appropriate to communicate address, data and control electrical signals between the various components of the backend server computer 104.

The backend server computer 104 further comprises a memory 1506, including non-volatile memory 1508 and volatile memory 1510. The memory 1506 is communicatively connected to bus 1502 for the bi-directional communication of computer software instructions, addresses, data and control signals with the bus 1502 and other components connected to the bus 1502, through one or more bi-directional communication paths 1512. Non-volatile memory 1508 generally stores information and/or data that will not be lost when electrical power to the non-volatile memory 1508 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 1510 typically stores information and/or data for a temporary period of time, as such information and/or data that will be lost when electrical power is no longer supplied to the volatile memory 1510. Examples of volatile memory include, but are not limited to, non-battery backed up random access memory devices.

According to the example embodiment, non-volatile memory 1508 stores a plurality of computer software instructions of an operating system 1514 that, when delivered to and executed by processing unit 1500, enable the processing unit 1500 and other backend server computer 104 components to perform various actions and provide the basic functionality necessary to implement the methods described herein. Non-volatile memory 1508 also stores pluralities of computer software instructions of application software 1516 that, when executed by a processing unit 1500, enable and cause the backend server computer 104 to perform functions associated with the application software 1516 and described herein such as the provision of video on demand, audio on demand, account management, and other services. Non-volatile memory 1508 additionally stores non-volatile application data 1518 that is used by the application software 1516. Such non-volatile application data 1518 may include, but not be limited to: video on demand data identifying categories of non-television program video and non-television program video available for viewing upon selection by the user; video on demand data representative of videos available for viewing and the cost associated therewith; audio on demand data identifying audio available for listening to at various times and on various channels upon selection by the user; audio on demand data representative of audio available for listening and the cost associated therewith; account management data including, perhaps, a user's account number and/or personal identification number (PIN) used to access the user's financial account with the cable television service provider and/or charge, to such account; and, other data required to provide the functionality described herein.

Volatile memory 1510 stores volatile application data 1520 that is created and/or used by the application software 1516 during execution. Volatile application data 1522 may include, for example, messages received from the frontend server computer 102, messages to be sent to the frontend server computer 102, intermediate data, and other information or data.

The backend server computer 104 also comprises communication interfaces 1522, 1524 that connect to bus 1502 via respective communication paths 1526, 1528 for the bi-directional communication of address, data and control signals therebetween. According to the example embodiment, communication interfaces 1522, 1524 respectively include: one or more communication interface(s) adapted, configured and operational to bi-directionally communicate messages, information and/or data with the frontend server computer 102 via communication links 106; and, one or more communication interface(s) adapted, configured and operational to bi-directionally communicate messages, commands, information and/or data (including, without limitation, data representative of video and/or audio programming for presentation via presentation devices 126) with television network 116 via communication links 124.

In accordance with example embodiment, the backend server computer 104 additionally comprises a display interface 1530 connected to bus 1502 via communication path 1532 for the bi-directional communication of addresses, data and/or control signals with the bus 1502 and various components connected to the bus 1502. A display 1534 is connected to the display interface 1530 via communication path 1536 for the receipt and display of video information and/or data received from the display interface 1530. Similarly, an input device interface 1538 is connected to bus 1502 via communication path 1540 for the bi-directional communication of addresses, data and/or control signals with the bus 1502 and various components connected to the bus 1502. A keyboard 1542 and pointing device 1544 are, respectively, connected to the input device interface 1538 via communication paths 1546, 1548 for the receipt of input from a user of the backend server computer 104 and for the communication of data representative of such input to the input device interface 1538. A power supply 1550 is connected to bus 1502 via electrical signal path 1552 to supply electrical energy to the bus 1502 and components connected to the bus 1502 that is necessary for their operation.

FIGS. 16A-E display a flowchart representation of a system access method 1600 according to the example embodiment of the present invention. The system access method 1600 comprises methods implemented by execution of the system access application 216B of a personal communication device 108 and complimentary methods implemented by computer software applications executed by the frontend server computer 102, backend server computer 104, and/or other components of the system 100. The system access method 1600 starts at step 1602 when initiated by the processing unit 200 receiving selection of the system access application 216B via a user selecting icon 308A from the personal communication device's "main" or "home" application skin 218A.

After starting at step 1602, the system access method 1600 advances to step 1604 where the processing unit 200 begins execution of the system access application 216B locally on the personal communication device 108. Then, at step 1604, the processing unit 200 generates and communicates a message to the frontend server computer 102 requesting the start of a communication session with the frontend server computer 102. Upon receiving the message, the frontend server computer 102 produces and sends an acknowledgement to the personal communication device 108, at step 1608, indicating that the frontend server computer 102 has received the message from the personal communication device 108. The frontend server computer 102 then establishes a communication session with the personal communication device 108 and, if not already being executed, begins executing computer software necessary to interact with the personal communication device 108 and to provide the functionality described herein to the personal communication device 108 by the frontend server computer 102, backend server computer 104, and other components of the system 100.

Once a communication session has been established, the processing unit 200 attempts to retrieve, at step 1610, user authentication information (e.g., a user name and password) stored as non-volatile application data 220 in non-volatile memory 208. If the processing unit 200 determines, at step 1612, that stored user authentication information exists, the processing unit 200 branches to step 1618 of the system access method 1600 described below. Alternatively, if the processing unit 200 determines, at step 1612, that no stored user authentication information exists, then the processing unit 200 moves to step 1614 of system access method 1600 where the processing unit 200 displays the user authentication skin 218B1 to prompt the user to enter valid authentication information. Next, at step 1616, the user respectively inputs a user name and password in the skin's user name input control/box 404 and password control/box 406 using keyboard 408 and the processing unit 200 receives the input user name and password.

Continuing at step 1618, the processing unit 200 produces a message including the input or stored user authentication information and communicates the message to the frontend server computer 102 for authentication. At step 1620, the frontend server computer 102 compares the received user authentication information to known valid user authentication information stored in the non-volatile memory 1408 of the frontend server computer 102 and determines if the received user authentication information is valid or invalid. The frontend server computer 102 then generates and sends a message to the personal communication device 108 communicating the result of the authentication process at step 1622. Upon receiving the message, the processing unit 200 extracts the result from the message at step 1624. If the result indicates that the authentication was unsuccessful (e.g., the user failed to input valid authentication information), the processing unit 200 branches to step 1626 where the processing unit 200 informs the user of the failure by causing the display of a failure notification on touch screen display 224 and loops back to step 1614 to again display the user authentication skin 218B1. Alternatively, if the result indicates that the authentication was successful (e.g., the user input valid authentication information), the processing unit 200 moves to step 1628 of system access method 1600 and again attempts to retrieve if stored authentication information from non-volatile memory 208 exists. If the processing unit 200 subsequently determines, at step 1630, that stored authentication information exists, then processing unit 200 advances to step 1640 to check for stored set top box information as described in more detail below.

If, at step 1630, the processing unit 200 determines that stored authentication information does not exist, the processing unit 200 branches to step 1632 to provide the user with an opportunity to store the recently input authentication information in the personal communication device's non-volatile memory 208 so that it will not be necessary to re-input it each time the user desires to use personal communication device 108 for accessing multimedia related applications 216. At step 1632, the processing unit 200 prompts the user, via touch screen display 224, for direction as to whether the processing unit 200 should store the recently input authentication information. After receiving a response from the user at step 1634, the processing unit 200 moves to step 1636 where it analyzes the response to determine if the recently received authentication information should be stored. If not, the processing unit 200 advances to step 1640 described below. If so, the processing unit 200 stores the recently received authentication information in non-volatile memory 208 at step 1638 and advances to step 1640 of the system access method 1600.

At step 1640, the processing unit 200 attempts to retrieve set top box information stored as non-volatile application data 222 in non-volatile memory 208. Set top box information for each set top box 118 generally includes a name for the set top box and information uniquely identifying the set top box 118 (such as, for example and not limitation, the unique media access control (MAC) number) corresponding in one-to-one correspondence with the set top box 118, but may include other information and/or data as well. Next, at step 1642, the processing unit 200 determines whether it was able to retrieve any set top box information and, hence, whether any set top box information exists. If the processing unit 200 determines that no set top box information exists, then the processing unit 200 initiates execution of the set top box add/edit application 216G at step 1644 using the set top box add/edit skin 218G to receive set top box information, including, but not limited to, a set top box name and information uniquely identifying the set top box 118 such as a corresponding media access control (MAC) number assigned to the set top box 118 by its manufacturer. After storing the received set top box information in non-volatile memory 208 and with the set top box 118 for which set top box information was received now becoming the set top box 118 with which the user and the personal communication device 108 are interacting during the communication session, the processing unit 200 jumps ahead to step 1654 described below. If, however, the processing unit 200 determines, at step 1642, that set top box information exists, the processing unit 200 retrieves the stored set top box information at step 1646 and then, at step 1648, decides whether information for more than one set top box exists, thereby indicating that the personal communication device 108 may be used with more than one set top box 118. If information for only one set top box 118 exists, the processing unit 200 branches ahead to step 1654. If information for multiple set top boxes 118 exists, the processing unit 200, at step 1650, displays the set top box selection skin 218B2 on the personal communication device's touch screen display 224 with the names of the set top boxes 118 for which information exists in non-volatile memory 208. Then, at step 1652, the processing unit 200 receives a selection of a set top box 118 input by the user through the set top box selection skin 218B2 and advances to step 1654 of system access method 1600. By selecting a set top box 118, the user has identified the set top box 118 with which he/she desires to interact with during the then current communication session using personal communication device 108 and with which personal communication device 108 will interact with until a different set top box 118 is selected or the current communication session with the frontend server computer 102 ends.

At step 1654, the processing unit 200 retrieves the stored set top box information (i) received from the user and stored in non-volatile memory 208 through execution of the set top box add/edit application 216G at step 1644 or (ii) corresponding to the set top box selection received from the user via the set top box selection skin 218B2 at step 1652. Using the retrieved set top box information, the processing unit 200 generates and communicates a message to the frontend server computer 102 requesting update data at step 1656. The update request message includes information (e.g., the media access control (MAC) number) uniquely identifying the set top box 118 with which the personal communication device 108 is currently interacting during the then current communication session. The update data generally includes information used by the personal communication device 108 to enable a user to interact with and make use of the various services provided by the cable television service provider via the personal communication device 108. According to the example embodiment, the update data comprises program guide information (including, without limitation, television program schedule information), video on demand information (including, without limitation, video category names and related video category information, and video titles and related video information), digital video recorder information (including, without limitation, information for television programs scheduled to be recorded and information for previously recorded television programs available for viewing), audio on demand information (including, without limitation, audio category names and related audio category information, and audio titles and related audio information), and account information pertaining to the user's account with the cable television server provider. The update data may, of course, include the same, different, or other data in different embodiments of the present invention.

In response to receiving a request for update data from the personal communication device 108, the frontend server computer 102 collects all of the update data appropriate for the personal communication device 108 from itself, the backend server computer 104, and other possible sources, and communicates the update data to the personal communication device 108 where, at step 1658, the processing unit 200 receives the communicated, or downloaded, update data from the frontend server computer 102 and appropriately stores the update data in non-volatile memory 208. Next, at step 1660, the processing unit 200 displays the multimedia application selection skin 218B3 on the touch screen display 224 of the personal communication device 108. The processing unit 200 then receives, at step 1662, a selection of an icon 600A-F uniquely corresponding to a multimedia application 216C-H from the user via the multimedia application selection skin 218B3.

Proceeding to step 1664, the processing unit 200 analyzes the selected multimedia application 216C-H and determines whether the program guide application 216C was selected by the user. If so, the processing unit 200 moves to step 1666 of system access method 1600 and begins execution of the program guide application 216C and operation according to the program guide method 1700 described below in more detail. Upon returning from execution of the program guide application 216C and operation in accordance with the program guide method 1700, the processing unit 200 returns to step 1660 of the system access method 1600 where the processing unit 200 again displays the multimedia application selection skin 218B3 and then resumes operation according to the system access method 1600.

If, at step 1664, the processing unit 200 determines that the program guide application 216C was not selected by the user, the processing unit 200 then ascertains, at step 1668, whether the video on demand application 216D was selected by the user. If so, the processing unit 200 initiates and continues execution of the video on demand application 216D at step 1670 and operates in accordance with the video on demand method 1800 described below in more detail. Upon exiting the video on demand application 216D and operation according to the video on demand method 1800, the processing unit 200 again displays the multimedia application selection skin 218B3 and resumes operation according to the system access method 1600 at step 1660 thereof.

Alternatively, if the processing unit 200 ascertains, at step 1668, that the video on demand application 216D was not selected by the user, the processing unit 200 advances to step 1672 of the system access method 1600 to decide if the digital video recorder (DVR) application 216E was selected by the user. If so, the processing unit 200 begins execution of the digital video recorder (DVR) application 216E at step 1674 and operates according to a digital video recorder (DVR) method not described in detail herein. After completing operation according to the digital video recorder (DVR) method, the processing unit 200 resumes operation in accordance with the system access method 1600 by again displaying the multimedia application selection skin 218B3 and advancing to stop 1662. If the processing unit 200 decides, at step 1672, that the digital video recorder (DVR) application 216E was not selected by the user at step 1662, the processing unit 200 branches ahead to step 1676 of system access method 1600.

At step 1676, the processing unit 200 determines whether the audio on demand application 216F was selected by the user at step 1662. If so, the processing unit 200, at step 1678, executes the audio on demand application 216G and functions in accordance with an audio on demand method that is not described in detail herein, but that is substantially similar to video on demand method 1800. Upon returning from execution of the audio on demand application 216G and functioning according to the audio on demand method, the processing unit 200 loops back to step 1660 to again display the multimedia application selection skin 218B3 and resume functioning in accordance with the system access method 1600.

If, at step 1676, the processing unit 200 determines that the audio on demand application 216F was not selected by the user at step 1662, the processing unit 200 advances to step 1680 where it ascertains whether the set top box (STB) add/edit application 216G was selected by the user. If so, the processing unit 200 begins execution of the set top box (STB) add/edit application 216G at step 1682 and operates according to a set top box add/edit method to receive a set top box name and unique identifying information as described above with respect to the set top box add/edit skin 218G. Upon selection of either the "done" button 1310 or "back" button 1312 from the set top box add/edit skin 218G, the processing unit 200 resumes operation according to the system access method 1600 at step 1660 by displaying the multimedia application selection skin 218B3.

Alternatively, if the processing unit 200 ascertains, at step 1680, that the user did not select the set top box (STB) add/edit application 216G, the processing unit 200 proceeds to step 1684 where it decides if the account management application 216H was selected by the user at step 1662. If so, the processing unit 200 initiates execution of the account management application 216H at step 1686 and operates according to an account management method not described in detail herein. Once the user ceases operation of the personal communication device 108 according to the account management method, the processing unit 200 returns to step 1660 of system access method 1600 to again display the multimedia application selection skin 218B3 and await a selection input by the user. If the processing unit 200 decides, at step 1684, that the user did not select the account management application 216H, the processing unit 200 branches ahead to step 1688 where it determines whether the "home" button 226 was selected by the user. If not, then the user must have selected another multimedia application 216I-Q and the processing unit 200 advances to step 1698 to execute the selected multimedia application 216I-Q and function in accordance with a method associated with the selected multimedia application 216I-Q. As described similarly above, when the processing unit 200 completes execution of the selected multimedia application 216I-Q, the processing unit 200 branches back to step 1660 to display the multimedia application selection skin 218B3 and resume operation in accordance with the system access method 1600.

If, at step 1688, the processing unit 200 determines that the "home" button 226 was selected by the user at step 1662, then the user desires to terminate the system access application 216B, stop operation of the personal communication device 108 according to the system access method 1600, and return to execution of the "main" or "home" application 216A by the personal communication device 108. In response, the processing unit 200 advances to step 1690 where it generates and communicates a message to the frontend server computer 102 requesting that the personal communication device's current communication session with the frontend server computer 102 be ended. The frontend server computer 102 then ends the communication session at step 1692. Subsequently, at step 1694, the processing unit 200 ends execution of the system access application 216B and operation according to the system access method 1600, re-displays the personal communication device's "main" or "home" application skin 218A, and begins execution of the personal communication device's corresponding "main" or "home" application 216A.

FIGS. 17A-D display a flowchart representation of a program guide method 1700 in accordance with the example embodiment of the present invention. The program guide method 1700 comprises methods implemented by execution of the program guide application 216C of a personal communication device 108 and complimentary methods implemented by computer software applications executed by the frontend server computer 102, backend server computer 104, and/or other components of the system 100. The program guide method 1700 starts at step 1702 when initiated by the processing unit 200 receiving selection of the program guide application 216C via a user selecting icon 600A from the personal communication device's multimedia application selection skin 218B3. At step 1702, the processing unit 200 begins execution of the program guide application 216C locally on the personal communication device 108. Then, at step 1704, the processing unit 200 generates and communicates a message to the frontend server computer 102 indicating that the program guide application 216C is being executed on the personal communication device 108. Next, at step 1706, the processing unit 200 displays the program selection skin 218C1 populated with program guide data stored as non-volatile application data 220 in non-volatile memory 208 (see FIG. 7). The processing unit 200 then receives input from the user via the program selection skin 218C1 at step 1708 and as described above with respect to FIG. 7.

Continuing at step 1710, the processing unit 200 determines whether the received user input corresponds to the user selecting to scroll the program guide information of the row and column matrix 700 presented via the program selection skin 218C1. If so, the processing unit 200 scrolls the rows 702 and/or columns 704 of the matrix 700, at step 1712, in the direction indicated by the user (e.g., up, down, right or left) to present other program guide information to the user via the program selection skin 218C1. The processing unit 200 then loops back to step 1708 to receive further input from the user. If the processing unit 200 determines, at step 1710, that the user did not select to scroll the program guide information, the processing unit 200 advances to step 1714 where it ascertains whether the received user input corresponds to selection of a television program by the user tapping the touch screen display 224 in the area of a program name. If a television program was selected, the processing unit 200 highlights the grid block including the name of the selected television program at step 1716 to acknowledge receipt of the selection to the user. Then, at step 1718, the processing unit 200 retrieves brief information associated with the selected television program from the non-volatile application data 220 stored in non-volatile memory 208 and displays the brief information in the brief program information panel 708 of the program selection skin 218C1. After displaying the brief information, the processing unit 200 returns to step 1708 of the program guide application 216C to receive further input from the user.

If, at step 1714, the processing unit 200 ascertains that a television program was not selected by the user, the processing unit 200 moves to step 1720 where it decides whether the user input comprises selection of the "info" button 718 from the program selection skin 218C1. If not, the processing unit 200 jumps ahead to step 1730 of the program guide method 1700 described below. If so, the processing unit 200, at step 1722, retrieves detailed program information for the then currently selected television program from non-volatile memory 208 and displays the detailed program information for the selected television program in the detailed information panel 800 of the program information skin 218C2 (see FIG. 8). Next, at step 1724, the processing unit 200 receives input from the user via the program information skin 218C2. At step 1726, the processing unit 200 decides whether the user input corresponds to the selection of the "back" button 802 on the program information skin 218C2. If not, the processing unit 200 loops back to step 1724 to receive further user input. If so, the processing unit 200 re-displays the program selection skin 218C1 on the touch screen display 224 and proceeds to step 1730 of the program guide method 1700.

At step 1730, the processing unit 200 determines whether the user input received at step 1708 corresponds to selection of the "done" button 720 by the user from the program selection skin 218C1. If the "done" button 720 was selected, the processing unit 200 generates and communicates a message to the frontend server computer 102 at step 1732. The message includes, at least, data identifying the then currently selected television program and information uniquely identifying the set top box 118 with which the personal communication device 108 is currently interacting during the communication session. Upon receiving the message from the personal communication device 108, the frontend server computer 102 generates a change channel message/command at step 1734 including, at least, the channel associated with the television program selected by the user and information uniquely identifying the set top box 118 to receive the message/command. The frontend server computer 102 then communicates the change channel message/command to the set top box 118 via the television network 116. Upon receiving and interpreting the change channel command, the set top box 118 tunes its tuner to the channel included in the command, thereby causing the presentation device 126 connected to the set top box 118 to present the desired television program. The processing unit 200 loops back to step 1708 to receive further input from the user. If, at step 1730, the processing unit 200 determines that the user input does not correspond to selection of the "done" button 720, the processing unit 200 advances to step 1736 of the program guide method 1700.

The processing unit 200, at step 1736, ascertains whether the user input received at step 1708 comprises a selection of either the "channel up" button 710 or the "channel down" button 712. If so, the processing unit 200 produces and communicates a message to the frontend server computer 102 via communication network 112 at step 1738. The message includes, at least, appropriate data indicating the particular button 710, 712 that was selected and information uniquely identifying the set top box 118 being currently interacted with via the personal communication device 108 during the current communication session. Responsive thereto, at step 1740, the frontend server computer 102 generates and communicates via the television network 116, as appropriate, a change channel up/down message/command addressed to the set top box 118 identified in the message received from the personal communication device 108. Upon receipt of the message/command, the set top box 118 changes the channel to which its tuner is tuned in either the up or down direction depending on whether the message/command comprises a change channel up message/command or a change channel down message/command, thereby causing the television channel presented for viewing on the connected presentation device 126 to change up or down, as the case may be. Processing unit 200 then returns to step 1708 to receive further input from the user.

Alternatively, if the processing unit 200 ascertains, at step 1736, that the user input does not comprise selection of either the "channel up" button 710 or "channel down" button 712, the processing unit 200 advances to step 1742 of the program guide method 1700. At step 1742, the processing unit 200 decides whether the user input received at step 1708 constitutes a selection of the "volume up" button 714 or the "volume down" button 716. If not, then user input corresponds to a selection of the "back" button 722 and the processing unit 200 moves forward to step 1744 where the processing unit 200 generates and sends a message to the frontend server computer 102 informing the frontend server computer 102 that the program guide application 216C is ending. Processing unit 200 then resumes execution of the system access application 216B and operation according to the system access method 1600 at step 1660 where it displays the multimedia application selection skin 218B3 as described above.

If, at step 1742, the processing unit 200 decides that the user input received at step 1708 constitutes a selection of the "volume up" button 714 or the "volume down" button 716, the processing unit 200 advances to step 1748 of the program guide method 1700. At step 1748, the processing unit 200 produces and communicates a message to the frontend server computer 102 via communication network 112. The message comprises, at least, appropriate data indicating the particular button 714, 716 that was selected and information uniquely identifying the set top box 118 being currently interacted with via the personal communication device 108 during the communication session. Then, at step 1740, the frontend server computer 102 generates and communicates via the television network 116, as appropriate, a change volume up/down message/command addressed to the set top box 118 identified in the message received from the personal communication device 108. Upon receipt of the message/command, the set top box 118 changes the volume level of the audio portion of the television signals corresponding to the television program in either the up or down direction depending on whether the message command comprises a change volume up message/command or a change volume down message/command, thereby causing the volume of the sound produced by the connected presentation device 126 to change up or down, as the case may be. Processing unit 200 then returns to step 1708 to receive further input from the user.

FIGS. 18A-E display a flowchart representation of a video on demand method 1800 according to the example embodiment of the present invention. The video on demand method 1800 includes methods implemented by execution of the video on demand application 216D of a personal communication device 108 and complimentary methods implemented by computer software applications executed by the frontend server computer 102, backend server computer 104, and/or other components of the system 100. The video on demand method 1800 starts at step 1802 when the processing unit 200 receives selection of the video on demand application 216D via a user selecting icon 600B from the personal communication device's multimedia application selection skin 218B3. The processing unit 200 begins execution of the video on demand application 216D locally on the personal communication device 108. Then, at step 1804, the processing unit 200 generates and communicates a message to the frontend server computer 102 indicating that the video on demand application 216D is being executed on the personal communication device 108. Next, at step 1806, the processing unit 200 retrieves video category data stored as non-volatile application data 220 in non-volatile memory 208 and displays category selection skin 218D1 having a plurality of icons 902 in video category panel 900. Each icon 902 corresponds to a category of videos from which a video may selected for viewing via the video on demand service provided by the cable television service provider (see FIG. 9). The processing unit 200 then receives input from the user via the category selection skin 218D1 at step 1808 and as described above with respect to FIG. 9.

Proceeding to step 1810, the processing unit 200 determines whether the received user input corresponds to the user selecting to scroll through the matrix 904 of icons 902 displayed in the video category panel 900 of the category selection skin 218D1. If so, the processing unit 200 scrolls the rows and/or columns of the matrix 904, at step 1812, in the direction indicated by the user (e.g., up, down, right or left) to present other icons 902 and, hence, video categories to the user via the category selection skin 218D1. The processing unit 200 then loops back to step 1808 to receive further input from the user. If, however, the processing unit 200 determines, at step 1810, that the user did not select to scroll the matrix 904 of icons 902 corresponding to categories of videos, the processing unit 200 advances to step 1814 where the processing unit 200 ascertains whether the user input comprises selection of a video category. If so, the processing unit 200 highlights the icon 902 including the name of the selected video category at step 1816 to acknowledge receipt of the selection to the user. Then, at step 1818, the processing unit 200 retrieves brief information associated with the selected video category from the non-volatile application data 220 stored in non-volatile memory 208 and displays the brief information in the brief category information panel 906 of the category selection skin 218D1. After displaying the brief information, the processing unit 200 returns to step 1808 of the video on demand application 216D to receive further input from the user.

Alternatively, if the processing unit 200 ascertains, at step 1814, that the user input does not comprise the selection of a video category, the processing unit 200 branches forward to step 1820 where the processing unit 200 decides whether the user input received at step 1808 constitutes selection of the "done" button 908. If not, the user input constitutes selection of the "back" button 910 and the processing unit 200 advances to step 1822 where the processing unit 200 generates and sends a message to the frontend server computer 102 informing the frontend server computer 102 that the video on demand application 216D is ending. Processing unit 200 then resumes execution of the system access application 216B and operation according to the system access method 1600 at step 1660 where it displays the multimedia application selection skin 218B3 as described above. If the processing unit 200 decides, at step 1820, that the user input constitutes selection of the "done" button 908, the processing unit 200 displays the video selection skin 218D2 at step 1826. Then, at step 1828, the processing unit 200 receives input from the user of the personal communication device 108 via the video selection skin 218D2.

Continuing at step 1830, the processing unit 200 determines whether user input received at step 1828 corresponds to selection of a row 1004 and, hence, a title of a video from video selection panel 1000. If the processing unit 200 determines that a title was selected, the processing unit 200 highlights the selected row 1004 including the selected title at step 1832, thereby acknowledging receipt of the selection to the user. Then, at step 1834, the processing unit 200 retrieves brief information associated with the selected title and, hence, video from the non-volatile application data 220 stored in non-volatile memory 208 and displays the brief information in the brief video information panel 1006 of the video selection skin 218D2. After displaying the brief information, the processing unit 200 returns to step 1828 of the video on demand method 1800 to receive further input from the user. If, at step 1830, the processing unit 200 determines that a title was not selected, the processing unit 200 proceeds to step 1836 where the processing unit 200 ascertains whether the user input received at step 1828 comprises selection of the "back" button 1012. If the "back" button 1012 was selected, the processing unit 200 re-displays the category selection skin 218D1 at step 1838 and then returns to step 1808 to receive further input from the user.

If, at step 1836, the processing unit 200 ascertains that the "back" button 1012 was not selected, the processing unit 200 branches to step 1840 to decide whether the user input received at step 1828 corresponds to selection of the "info" button 1008. If not, the user input comprises selection of the "done" button 1010 and the processing unit 200 jumps ahead to step 1850 of the video on demand method 1800 described below. If so, the processing unit 200 retrieves detailed information for the then currently selected video from non-volatile memory 208 at step 1842 and displays the video information skin 218D3 including the retrieved detailed information (see FIG. 11). Then, at step 1844, the processing unit 200 receives input from the user via the video information skin 218D3. At step 1846, the processing unit 200 determines whether the user input corresponds to the selection of the "back" button 1102 on the video information skin 218D3. If not, the processing unit 200 loops back to step 1844 to receive further user input. If so, the processing unit 200 re-displays the video selection skin 218D2 on the touch screen display 224 and loops back to step 1828 of the video on demand method 1800.

At step 1850, the processing unit 200 generates and communicates a message to the frontend server computer 102 via communication network 112 to inform the frontend server computer 102 that the user has selected a video for viewing via the multimedia content service provider's video on demand service. The message includes, at least, information and/or data identifying the video selected by the user from the video selection skin 218D2 and uniquely identifying the set top box 118 with which the personal communication device 108 is currently interacting during the communication session. Upon receiving the message from personal communication device 108 at step 1852, the frontend server computer 102 forwards the message to the backend server computer 104 via communication link 106. The backend server computer 104 receives the message at step 1854, performs necessary housekeeping chores, for example, to charge the user's account for viewing the video if appropriate, and begins playing back or streaming the video to the identified set top box 118 identified via the television network 116. Subsequently, at step 1856, the presentation device 126 connected to the identified set top box 118 receives the video from the set top box 118 and presents the video to the user.

Once the video playback, or streaming, begins, the processing unit 200 displays the video control skin 218D4 on the personal communication device's touch screen display 224 at step 1858 of the video on demand method 1800. Then, at step 1860, the processing unit 200 receives the selection of a button 1202 input by the user via the video control skin 218D4 and touch screen display 224. At step 1862, the processing unit 200 generates and communicates a message to the frontend server computer 102 via communication network 112. At minimum, the message includes data representative of, or identifying, the selected button 1202 and information uniquely identifying the then current set top box 118 that the personal communication device 108 is interacting with during the communication session. In response to receiving the message, the frontend server computer 102 forwards the message to the backend server computer 104 via communication link 106 at step 1864. The backend server computer 104 receives the message at step 1866 and takes appropriate action based on which button 1202 was selected by the user and the corresponding data present in the message representing the button 1202.

For example, if the selected button 1202 comprises the "play" button 1202A, the backend server computer 104 begins playing back, or streaming, video in the forward direction and at normal speed either from the start of the video or from a frame at which the video was paused prior to selection of the "play" button 1202A. If the selected button 1202 comprises the "pause" button 1202B, the backend server computer 104 temporarily suspends further playback, or steaming, of the video and repeatedly communicates to the set top box 118, the video frame being played back at the time when the backend server computer 104 received the message at step 1866. If the selected button 1202 comprises the "stop" button 1202C, the backend server computer 104 ceases playback, or streaming, of the video and may communicate to the set top box 118, video providing options or possible selections applicable to the video on demand service of the multimedia content service provider. If the selected button 1202 comprises the "fast forward" button 1202D or the "super fast forward" button 1202E, the backend server computer 104 continues playback, or streaming, of the video in the forward direction, but at faster and much faster speeds, respectively, than the normal playback speed. If the selected button 1202 comprises the "fast reverse" button 1202F or the "super fast reverse" button 1202G, the backend server computer 104 plays back, or streams, the video in the backward direction at faster and much faster speeds, respectively, than the normal playback speed. If the selected button 1202 comprises the "frame advance" button 1202H or the "frame reverse" button 1202I, the backend computer server 104, respectively, communicates the then next frame or the preceding frame of the video to the set top box 118.

In further example, if the selected button 1202 comprises the "volume up" button 1202J or "volume down" button 1202K, the backend server computer 104 continues playback, or streaming, of the video, but increases or reduces, respectively, the audio signal level associated with the audio portion of the video communicated to the set top box 118. If the selected button 1202 comprises the "mute" button 1202L, the backend server computer 104 again continues playback, or streaming, of the video, but temporarily ceases sending the audio portion of the video communicated to the set top box 118 until the "mute" button 1202L, a "volume up" button 1202J, or a "volume down" button 1202K are selected from the personal communication device 108 by the user.

In still further example, if the selected button 1202 comprises the "up arrow" button 1202M, "down arrow" button 1202N, "right arrow" button 1202O, or "left arrow" button 1202P, the backend server computer 104 disregards the buttons 1202M-P during playback, or streaming, of a video. However, if these buttons 1202M-P are selected when the backend server computer 104 is communicating an image to the set top box 118 associated with a selection screen of the video on demand service presenting various options to the user, the backend server computer 104 moves the cursor seen on the selection screen in the direction indicated by the selected button 1202M-P. Finally, if the selected button 1202 comprises the "select" button 1202Q, the backend server computer 104 disregards the button 1202Q during playback, or streaming, of a video, but interprets the button 1202Q as a selection of the option or item at the location of the cursor seen in a selection screen of the video on demand service and then takes appropriate as defined by the computer software and methods employed by the video on demand service.

At or about the same time as when the backend server computer 104 is taking appropriate action depending on the button 1202 identified in the message received at step 1866, the processing unit 200 determines, at step 1868, whether the user input received at step 1860 constitutes selection of the "stop" button 1202C. If so, the processing unit 200 re-displays the video selection skin 218D2 on the touch screen display 224 of the personal communication device 108 at step 1872 and loops back to step 1808 to receive further user input. If not, the presentation device 126 connected to the set top box 118 identified in the message received by the backend server computer 104 at step 1866 receives video from the backend server computer 104, via television network 116 and such set top box 118, and presents the video for viewing, while the processing unit 200 returns to step 1860 of the video on demand method 1800 to receive further input from the user via the video control skin 218D4.

Whereas the present invention has been described in detail above with respect to an example embodiment thereof, it should be appreciated that variations and modifications might be effected within the spirit and scope of the present invention, as described herein before and as defined in the appended claims.

What is claimed is:

1. A system for providing multimedia content to an end user cable television network interface device, the system comprising:
   a cable television distribution network for delivering multimedia content to an end user cable television network interface device; and
   a computer for interacting with a portable handheld communication device via a data communication network, said computer being adapted to receive data corresponding to a selection of multimedia content made at said portable handheld communication device and for causing the delivery of said multimedia content to said end user cable television network interface device by said cable television distribution network in response to said selection without using the cable television network interface device to make the request, said data communication network and said cable television distribution network comprising different networks, said portable handheld communication device being adapted to execute a computer software application comprising a plurality of computer software instructions.

2. The system of claim 1, wherein said data communication network comprises the Internet.

3. The system of claim 1, wherein said cable television network interface device comprises a set top box.

4. The system of claim 1, wherein said system further comprises a computer software application executable at said portable handheld communication device for providing at said portable handheld communication device information identifying multimedia content available for selection.

5. The system of claim 4, wherein said computer is further adapted to download said computer software application to said portable handheld communication device via said data communication network.

6. The system of claim 4, wherein said computer is further adapted to download said information identifying said multimedia content to said portable handheld communication device via said data communication network.

7. The system of claim 1, wherein said multimedia content comprises a video available through a video on demand service.

8. The system of claim 1, wherein said multimedia content comprises a television program.

9. The system of claim 1, wherein said multimedia content comprises audio available through an audio on demand service.

10. The system of claim 1, wherein said computer is further adapted to receive data from said portable handheld communication device uniquely identifying an end user cable television network interface device for receiving delivery of said multimedia content and to cause delivery of said multimedia content to said end user cable television network interface device identified by said data.

11. The system of claim 1, wherein said computer is further adapted to download to said portable handheld communication device via said data communication network information corresponding to a television program guide identifying television programs available for selection and delivery to said end user cable television network interface device.

12. A method of providing multimedia content to an end user cable television network interface device communicatively connected to cable television distribution network, the method comprising the steps of:
   establishing a communication session with a portable handheld personal communication device;
   receiving information from the portable handheld personal communication device during the communication session identifying multimedia content for provision to the end user cable television network interface; and
   communicating the identified multimedia content to the end user cable television network interface via the cable television distribution network without using the cable television network interface device to send the information.

13. The method of claim 12, wherein the step of establishing a communication session comprises establishing a communication session over a data communication network.

14. The method of claim 13, wherein the data communication network comprises the Internet.

15. The method of claim 13, wherein the data communication network comprises a data communication network other than the cable television distribution network.

16. The method of claim 12, wherein the method further comprises a step of receiving information from the personal communication device uniquely identifying the end user cable television network interface device.

17. The method of claim 12, wherein the method further comprises a step of receiving data representative of a direction from the portable handheld personal communication device for controlling the provision of multimedia content to the end user cable television network interface device.

18. The method of claim 17, wherein the data representative of a direction comprises data corresponding to a play command.

19. The method of claim 12, wherein the method further comprises a step of downloading to the portable handheld personal communication device data representative of a television program schedule.

20. The method of claim 12, wherein the method further comprises a step of downloading to the portable handheld personal communication device data representative of video programming available for provision to the end user cable television network interface from a video on demand service.

21. The method of claim 12, wherein the method further comprises a step of downloading to the portable handheld personal communication device data representative of audio programming available for provision to the end user cable television network interface device from an audio on demand service.

22. The method of claim 12, wherein the method further comprises a step of downloading a computer software application to the portable handheld personal communication device for causing the portable handheld personal communication device to present data representative of a television program schedule on the portable handheld personal communication device when the computer software application is executed by the portable handheld personal communication device.

23. The method of claim 12, wherein the method further comprises a step of downloading a computer software application to the portable handheld personal communication device for causing the portable handheld personal communication device to present on the personal communication device data corresponding to a plurality of multimedia content related services accessible via the portable handheld personal communication device.

24. The method of claim 12, wherein the method further comprises a step of downloading to the portable handheld end user personal communication device a computer software application skin providing a user interface for user interaction with a cable television service provider.

25. A method of providing multimedia content to an end user cable television network interface device communicatively connected to cable television distribution network, the method comprising the steps of:
   operating a computer to interact via a data communication network with a handheld portable end user personal communication device configured to display information identifying multimedia content available for delivery to an end user cable television network interface device and to obtain a selection of multimedia content desired for delivery to the end user cable television network interface without using the cable television network interface device to make a request; and
   upon receiving a selection of multimedia content, causing the cable television distribution network to deliver the selected multimedia content to the end user cable television network interface.

26. The method of claim 25, wherein the step of operating a computer further comprises operating the computer to communicate information comprising a television program guide to the handheld portable end user personal communication device for display on the handheld portable end user personal communication device.

27. The method of claim 25, wherein the selection of multimedia content corresponds to the selection of a television program.

28. The method of claim 25, wherein the selection of multimedia content corresponds to the selection of a television channel.

29. The method of claim 25, wherein the step of operating a computer further comprises operating the computer to (i) receive from the handheld portable personal communication device information purportedly identifying a user permitted to interact with the computer via the handheld portable personal communication device and (ii) determine whether the user is or is not permitted to interact with the computer.

30. The method of claim 25, wherein the step of operating a computer further comprises operating the computer to receive from the handheld portable personal communication device information uniquely identifying the end user cable television network interface device to receive multimedia content via the cable television distribution network.

31. The method of claim 25, wherein the step of operating a computer further comprises operating the computer to receive a message from the handheld portable personal communication device requesting alteration of multimedia content playback to the end user cable television network interface device and to cause the requested alteration to occur.

32. The method of claim 31, wherein the message includes data requesting stoppage of multimedia content playback.

33. The method of claim 31, wherein the message includes data requesting a change to the speed of multimedia content playback.

34. The method of claim 31, wherein the message includes data requesting a change to direction of multimedia content playback.

35. The method of claim 31, wherein the message includes data requesting a change to the volume of the sound being produced during multimedia content playback.

\* \* \* \* \*